United States Patent
Maeda et al.

(10) Patent No.: US 9,015,434 B2
(45) Date of Patent: Apr. 21, 2015

(54) STORAGE SYSTEM, AND APPARATUS AND METHOD FOR CONTROLLING STORAGE

(75) Inventors: Chikashi Maeda, Kawasaki (JP); Hidejirou Daikokuya, Kawasaki (JP); Kazuhiko Ikeuchi, Kawasaki (JP); Takeshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 13/586,587

(22) Filed: Aug. 15, 2012

(65) Prior Publication Data

US 2013/0054913 A1 Feb. 28, 2013

(30) Foreign Application Priority Data

Aug. 31, 2011 (JP) ................... 2011-190133

(51) Int. Cl.
*G06F 12/00* (2006.01)
*G06F 9/50* (2006.01)
*G06F 11/10* (2006.01)

(52) U.S. Cl.
CPC .............. *G06F 9/50* (2013.01); *G06F 11/1092* (2013.01); *G06F 2209/5017* (2013.01)
USPC .......................................... 711/162; 711/154

(58) Field of Classification Search
USPC ................................................ 711/154, 162
See application file for complete search history.

(56) References Cited

U.S. PATENT DOCUMENTS

| | | | |
|---|---|---|---|
| 5,822,584 A | 10/1998 | Thompson | |
| 6,732,232 B2 | 5/2004 | Krishnamurthy | |
| 7,254,813 B2 | 8/2007 | Leong et al. | |
| 7,562,249 B2 | 7/2009 | Daikokuya et al. | |
| 2003/0182503 A1 | 9/2003 | Leong et al. | |
| 2005/0216688 A1 | 9/2005 | Watanabe | |

FOREIGN PATENT DOCUMENTS

| | | |
|---|---|---|
| CN | 1955940 A | 5/2007 |
| JP | 2003-202967 | 7/2003 |
| JP | 2005-275537 | 10/2005 |
| JP | 2007-94994 | 4/2007 |
| JP | B-4322068 | 8/2009 |
| JP | B-4472917 | 6/2010 |

(Continued)

OTHER PUBLICATIONS

Extended European Search Report dated Nov. 29, 2012 for corresponding European Application No. 12181004.8.
Chinese Office Action issued on Oct. 31, 2014 for corresponding Chinese Patent Application No. 201210314167.6, with English Translation, 31 pages.

(Continued)

*Primary Examiner* — Matthew Bradley
(74) *Attorney, Agent, or Firm* — Fujitsu Patent Center

(57) ABSTRACT

A rebuild control unit splits a rebuild process into partial processes and instructs an access processing unit to execute the partial processes. In the rebuild process, data identical to data recorded in a first storage device that constitutes RLU #1 is generated based on data read from, among storage devices constituting RLU #1, storage devices other than the first storage device and written to a spare storage device included in a storage system. Each partial process includes a combination of an operation of reading data from a split range created by splitting a data readout target range into fixed-size intervals and an operation of writing data in another storage device based on the data read from the split range. In response to the instruction from the rebuild control unit to execute the multiple partial processes, the access processing unit executes the instructed partial processes in parallel.

20 Claims, 14 Drawing Sheets

(56) References Cited

FOREIGN PATENT DOCUMENTS

| | | |
|---|---|---|
| JP | 2011-100919 | 5/2011 |
| WO | 2010/051002 A1 | 5/2010 |

OTHER PUBLICATIONS

JPOA—Office Action mailed Feb. 24, 2015 for corresponding Japanese Application No. 2011-190133, with English translation of relevant part: p. 1 line 17 to p. 2 line 35.

FIG. 9

242 MULTIPLICITY SETUP TABLE

| RAID LEVEL | NUMBER OF DISKS | CONFIGURATION-SPECIFIC MULTIPLICITY UPPER LIMIT |
|---|---|---|
| RAID-1 | 2 | a1 |
| | 3 | a2 |
| | 4 ~ | a3 |
| RAID-4,5 | ~ 4 | b1 |
| | 5 ~ 8 | b2 |
| | . . . | . . . |
| . . . | . . . | . . . |

STORAGE SYSTEM, AND APPARATUS AND METHOD FOR CONTROLLING STORAGE

CROSS-REFERENCE TO RELATED APPLICATION

This application is based upon and claims the benefit of priority of the prior Japanese Patent Application No. 2011-190133, filed on Aug. 31, 2011, the entire contents of which are incorporated herein by reference.

FIELD

The embodiments discussed herein are related to a storage system, a storage control apparatus, and a storage control method.

BACKGROUND

Storage systems which use multiple storage devices, such as hard disk drives (HDDs), are in wide use in recent years. In such a storage system, recording control is generally implemented in such a manner that data is redundantly stored in two or more storage devices using redundant arrays of inexpensive disks (RAID) technology, which improves security of the recorded data. In a storage system where data is stored redundantly, if a storage device fails, data stored in the failed storage device is reconstructed and stored in a different storage device, such as a spare storage device called "hot spare". Such a process is commonly termed the "rebuild process". Redundancy of the data is re-established when the rebuild process is performed.

As for storage systems, it is sought to carry out the rebuild process simultaneously with in/out (I/O) processes for storage devices performed based on requests from a host device (hereinafter, referred to as the "host I/O processes"), without stopping the host I/O processes. In this case, it is preferable to perform the rebuild process while decreasing the performance of the host I/O processes as little as possible. However, on the other hand, a demand has also been raised for reducing the time required for the rebuild process.

In view of the above-described problems, consideration has been given to controlling the balance of load between the host I/O processes and the rebuild process. For example, a storage system has been proposed in which the number of host I/O processes in progress and the number of rebuild processes in progress are managed and, then, the number of execution requests for rebuild processes is controlled in accordance with the number of host I/O processes in progress. Another storage system has been proposed in which the size of each operation of the rebuild process is changed in accordance with the presence or absence of host I/O processes. Yet another storage system has been proposed in which, in the case where no I/O request from a host device is received within a predetermined period of time, a write operation at an address and a read operation at a different address in the rebuild process are carried out in parallel.

Japanese Patent No. 4322068
Japanese Laid-open Patent Publication No. 2007-94994
Japanese Patent No. 4472917

In accordance with the recent increase in storage area capacity of storage systems, the time required for the rebuild process tends to increase. For this reason, it is a challenge to further reduce the time required for the rebuild process.

SUMMARY

According to one aspect, there is provided a storage system including a storage apparatus group which includes multiple storage apparatuses and a storage control apparatus which includes an access processing unit and a rebuild control unit. The access processing unit is configured to access storage apparatuses assigned to a logical storage area, which is made up of storage areas of two or more of the storage apparatuses included in the storage apparatus group. In the logical storage area, data recording is controlled in such a manner that data is redundantly stored in another storage apparatus. The rebuild control unit is configured to cause the access processing unit to execute a rebuild process, in which data identical to data recorded in a first storage apparatus among the storage apparatuses assigned to the logical storage area, is generated based on data read from the assigned storage apparatuses other than the first storage apparatus, and the generated data is written to a different storage apparatus which is one of a spare storage apparatus included in the storage apparatus group and a second storage apparatus replaced with the first storage apparatus. The rebuild control unit splits the rebuild process into partial processes each including a combination of a data read process and a data write process. In the data read process, data is read from one of split ranges created by splitting a data readout target range. In the data write process, data is written to the different storage apparatus based on the data read from the split range. The rebuild control unit instructs the access processing unit to execute the partial processes. In response to the instruction from the rebuild control unit, the access processing unit executes the partial processes in parallel.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an example of information registered in a multiplicity setup table;

DESCRIPTION OF EMBODIMENTS

Figure 1:
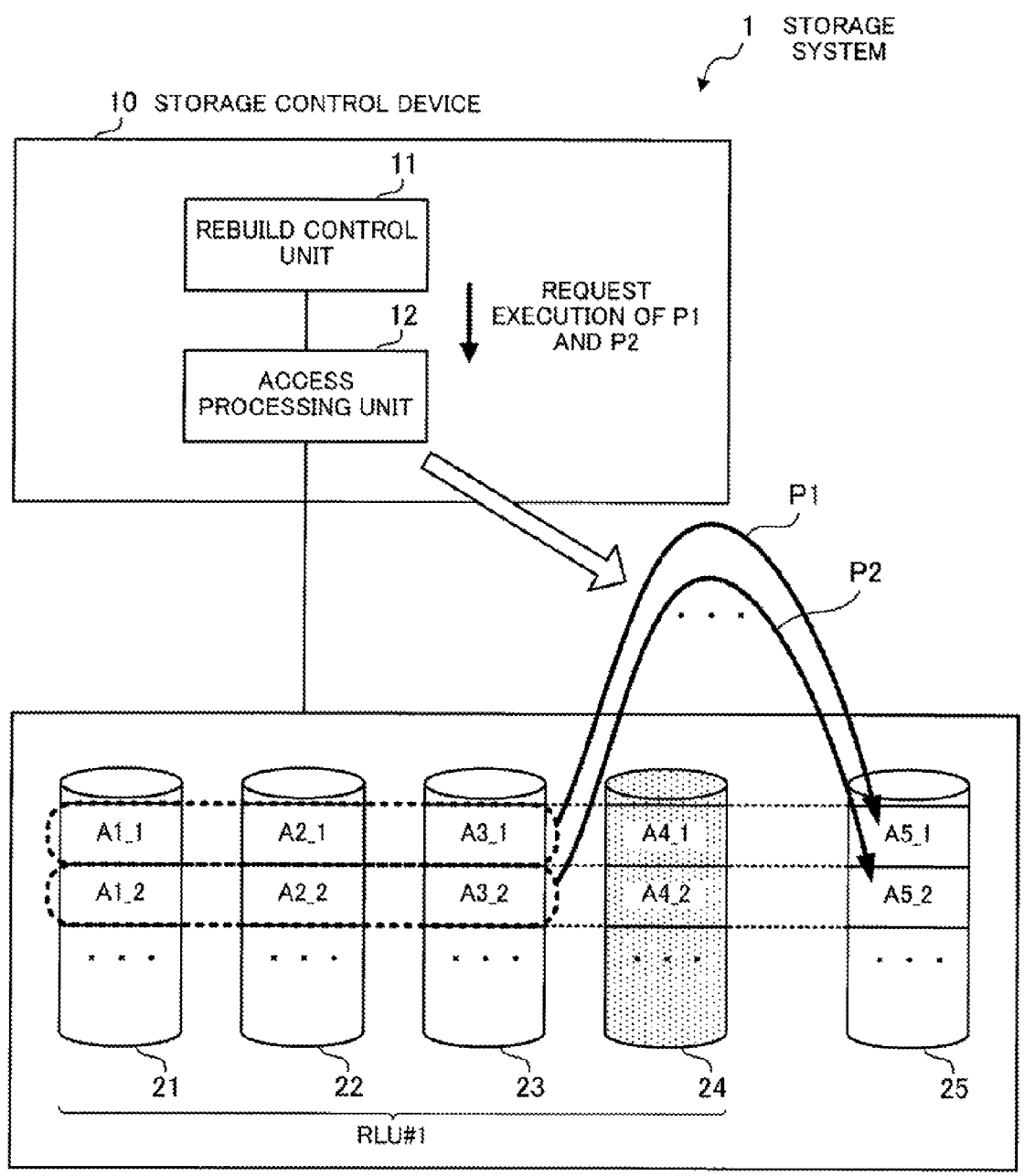
FIG. 1 illustrates a configuration example of a storage system according to a first embodiment.

Several embodiments will be described below with reference to the accompanying drawings, wherein like reference numerals refer to like elements throughout.

(a) First Embodiment

FIG. 1 illustrates a configuration example of a storage system according to a first embodiment. A storage system 1 includes a storage control device 10 and multiple storage devices. The storage devices included in the storage system 1 are nonvolatile storage devices, such as HDDs and solid state drives (SSDs). FIG. 1 illustrates storage devices 21 to 25 as an example of the storage devices included in the storage system 1.

In response to a request from a host device (not illustrated), the storage control device 10 exercises control over access to the storage devices of the storage system 1. In addition, the storage control device 10 controls access processes to the storage devices on the basis of logical storage areas, each of which is made up of storage areas of multiple storage devices. A data record for each logical storage area is controlled in such a manner that data is redundantly stored in a different storage device. Such a logical storage area is hereinafter referred to as the "RLU (RAID logical unit)". According to the example of FIG. 1, storage areas of the individual storage devices 21 to 24 belong to a single RLU, "RLU #1".

The storage control device 10 includes a rebuild control unit 11 and an access processing unit 12. Individual processes performed by the rebuild control unit 11 and the access processing unit 12 are implemented, for example, by a central processing unit (CPU) of the storage control device 10 executing predetermined programs. The rebuild control unit 11 causes the access processing unit 12 to execute a rebuild process. The rebuild process is a process in which data identical to data recorded in one storage device (referred to as a "first storage device") that constitutes a single RLU is generated based on data read from, among storage devices constituting the RLU, storage devices other than the first storage device, and then the generated data is written to a spare storage device included in the storage system 1 or to a second storage device replaced with the first storage device.

Note that, for example, in the case where the RLU is controlled in such a manner that data redundancy is provided using parity as in RAID 4, 5 and 6, data to be written to the write destination is generated through calculation based on data read from storage devices constituting the RLU, other than the first storage device. However, in the case where the RLU is controlled using, for example, mirroring as in RAID 1, the data read from the storage devices other than the first storage device is directly written to the write destination.

The access processing unit 12 executes the above-mentioned rebuild process in response to a request from the rebuild control unit 11. The rebuild process executed by the access processing unit 12 is split into partial processes each including a combination of two operations: an operation of reading data from a split range which is created by splitting a target range for data readout into fixed-size intervals; and an operation of writing data in another storage device based on the data read from the split range. Here, when causing the access processing unit 12 to execute the rebuild process for one RLU, the rebuild control unit 11 instructs the access processing unit 12 to carry out multiple partial processes, to thereby cause the access processing unit 12 to carry out the instructed multiple partial processes in parallel. Thus, multiple partial processes are carried out in parallel, which speeds up the rebuild process.

Procedures of the rebuild process for RLU #1 of FIG. 1 are described next as an example. Assume here that, as an example, RLU #1 is controlled in such a manner that data redundancy is provided using parity as in RAID 4, 5 and 6. In addition, assume in the following description that the storage device 24 has failed and data recorded in the failed storage device 24 is to be stored in the spare storage device 25. The rebuild control unit 11 instructs the access processing unit 12 to carry out partial processes, to thereby cause the access processing unit 12 to execute the rebuild process. A partial process is carried out with respect to each split range created by splitting a data readout target range of the rebuild process into fixed-size intervals. Here described are the terms "data readout target range" and "split range" according to the example of FIG. 1. The "data readout target range" is the storage areas of the storage devices 21 to 23. As illustrated in FIG. 1, the storage area of the storage device 24 is split into fixed-size intervals, to thereby create areas A4_1, A4_2, and . . . . Each "split range" is composed of storage areas of the remaining storage devices constituting the same RLU (that is, the storage devices 21 to 23), which storage areas correspond to one of the created areas A4_1, A4_2, and . . . of the storage device 24. For example, areas A1_1, A2_1, and A3_1 of the storage devices 21 to 23, respectively, correspond to an area A4_1 of the storage device 24 and make up one split range. Note that, in the case where RLU #1 is controlled using RAID 1, the data readout target range is one of the storage devices 21 to 23. In this case, a split range corresponding to the area A4_1 is one of the areas A1_1, A2_1, and A3_1.

One partial process of the rebuild process for RLU #1 illustrated in FIG. 1 includes a combination of an operation of reading data from one split range (for example, the areas A1_1, A2_1, and A3_1) and an operation of writing data generated based on the read data to a corresponding area of the storage device 25 (for example, an area A5_1). The access processing unit 12 executes the rebuild process on the basis of such a partial process. By instructing the access processing unit 12 to carry out multiple partial processes, the rebuild control unit 11 causes the access processing unit 12 to carry out the instructed multiple partial processes in parallel. According to the example of FIG. 1, the rebuild control unit 11 instructs the access processing unit 12 to carry out a partial process P1 including data readout from the areas A1_1, A2_1, and A3_1 and a partial process P2 including data readout from areas A1_2, A2_2, and A3_2. In response to the instruction, the access processing unit 12 carries out the instructed partial processes P1 and P2 in parallel. Thus, multiple partial processes are carried out in parallel by the access processing unit 12, which results in speed-up of the rebuild process. For example, in FIG. 1, write of data to the area A5_1 in the partial process P1 and readout of data from the areas A1_2, A2_2, and A3_2 in the partial process P2 may be carried out at the same time. With this, the access processing unit 12 is able to start to carry out the partial process P2 before completion of the partial process P1, which results in a reduction in the time required for the entire rebuild process. As described above, each partial process includes a process of reading data from a split range and a process of writing data generated based on the read data to a different storage device. Accordingly, in one partial process, for example, the same address value may be used for a Logical Block Address (LBA) for identifying a read source and a LBA for identifying a write destination. Therefore, it is possible to simplify procedures of the access processing unit 12 to carry out partial processes in parallel, which in turn improves efficiency of the rebuild process.

Note that, by instructing the access processing unit 12 to carry out one or more partial processes with respect to each of multiple logical storage areas, the rebuild control unit 11 is able to cause the access processing unit 12 to execute the rebuild processes of the individual logical storage areas in parallel. In this case, it is possible to speed up the entire rebuild processes of the multiple logical storage areas. In addition, by adjusting the number of partial processes that the rebuild control unit 11 instructs the access processing unit 12 to carry out, the rebuild control unit 11 is able to increase or decrease the processing load imposed on the storage control device 10 due to the rebuild process. Further, in the case of executing the rebuild processes with respect to individual logical storage areas in parallel, the number of partial processes that the rebuild control unit instructs the access processing unit 12 to carry out may be changed for each of the logical storage areas. With this, it is possible to adjust the load balance of the rebuild processes of the individual logical storage areas.

Next described is a second embodiment which is directed to an example of a storage system including a storage control device with a function to adjust load of the rebuild process.

(b) Second Embodiment

Figure 2:
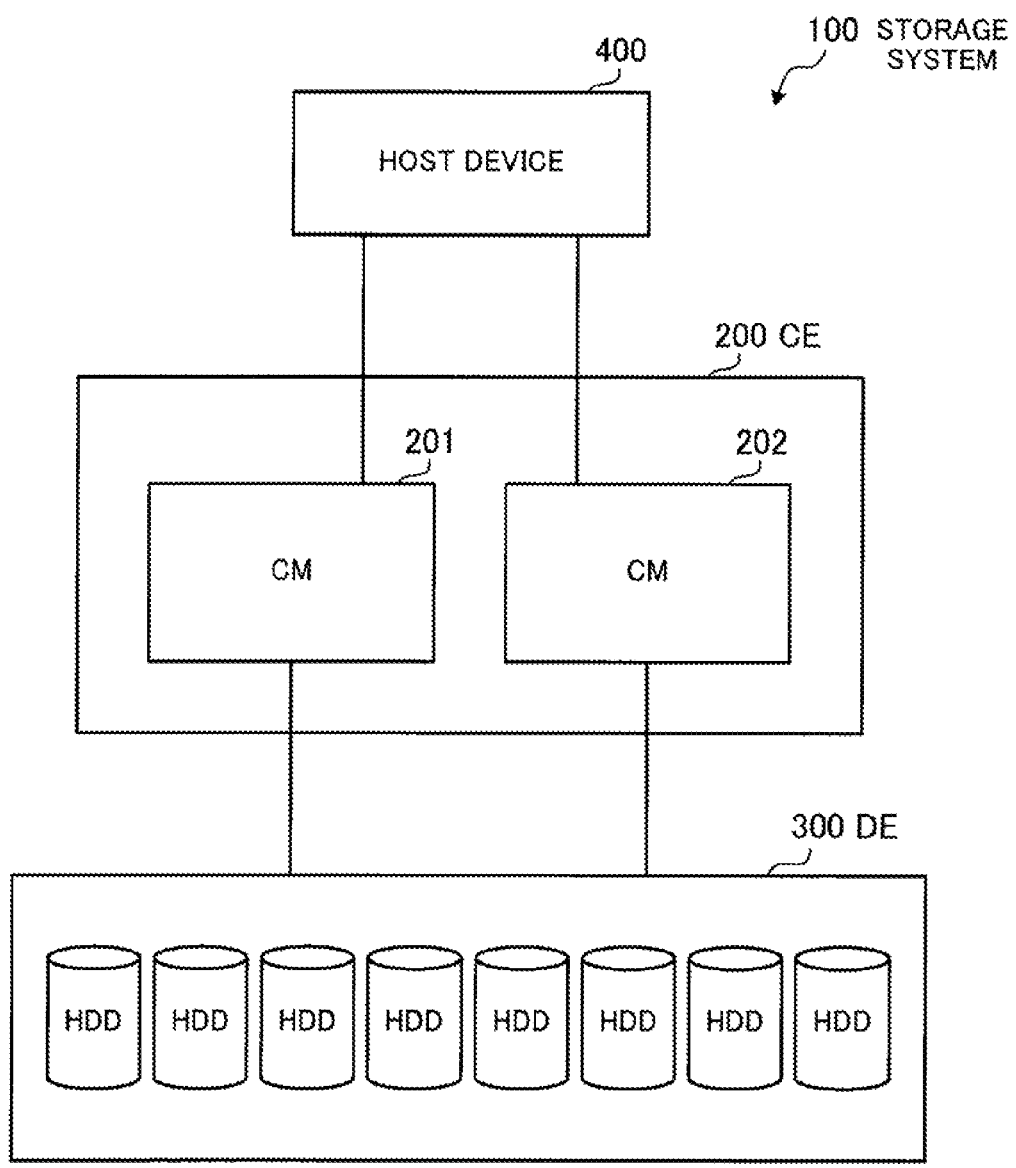
FIG. 2 illustrates an example of an overall configuration of a storage system according to a second embodiment.

FIG. 2 illustrates an example of an overall configuration of a storage system according to the second embodiment. A storage system 100 of FIG. 2 includes a controller enclosure (CE) 200 and a drive enclosure (DE) 300. In addition, to the CE 200, a host device 400 is connected. The CE 200 includes controller modules (CMs) 201 and 202. Each of the CMs 201 and 202 reads and writes data from and to a storage device in the DE 300 in response to an In/Out (I/O) request from the host device 400. The CMs 201 and 202 manage physical storage areas which are provided by storage devices of the DE 300 using RAID and control access to the physical storage areas. Note that the CMs 201 and 202 may be connected to each other, for example, via a router. In addition, a single CM or three or more CMs may be provided in the CE 200. Note however that providing multiple CMs increases redundancy of an access control system for the DE 300, which improves reliability of access control processing. The DE 300 includes multiple storage devices to be access control targets of the CMs 201 and 202. The DE 300 of this embodiment is a disk array apparatus including HDDs as storage devices. Note that other types of nonvolatile storage devices, such as SSDs, may be used as storage devices of the DE 300. In addition, multiple DEs 300 may be connected to the CE 200. In response to a user operation, the host device 400 makes a request to the CMs 201 and 202 for access to an HDD of the DE 300. For example, in response to a user operation, the host device 400 is able to read data from an HDD of the DE 300 and write data to an HDD of the DE 300 via one of the CMs 201 and 202. Note that both the CMs 201 and 202 of the CE 200 have a similar configuration and are able to carry out similar processing. Accordingly, the following gives a description of the CM 201 only and the description of the CM 202 is omitted.

Figure 3:
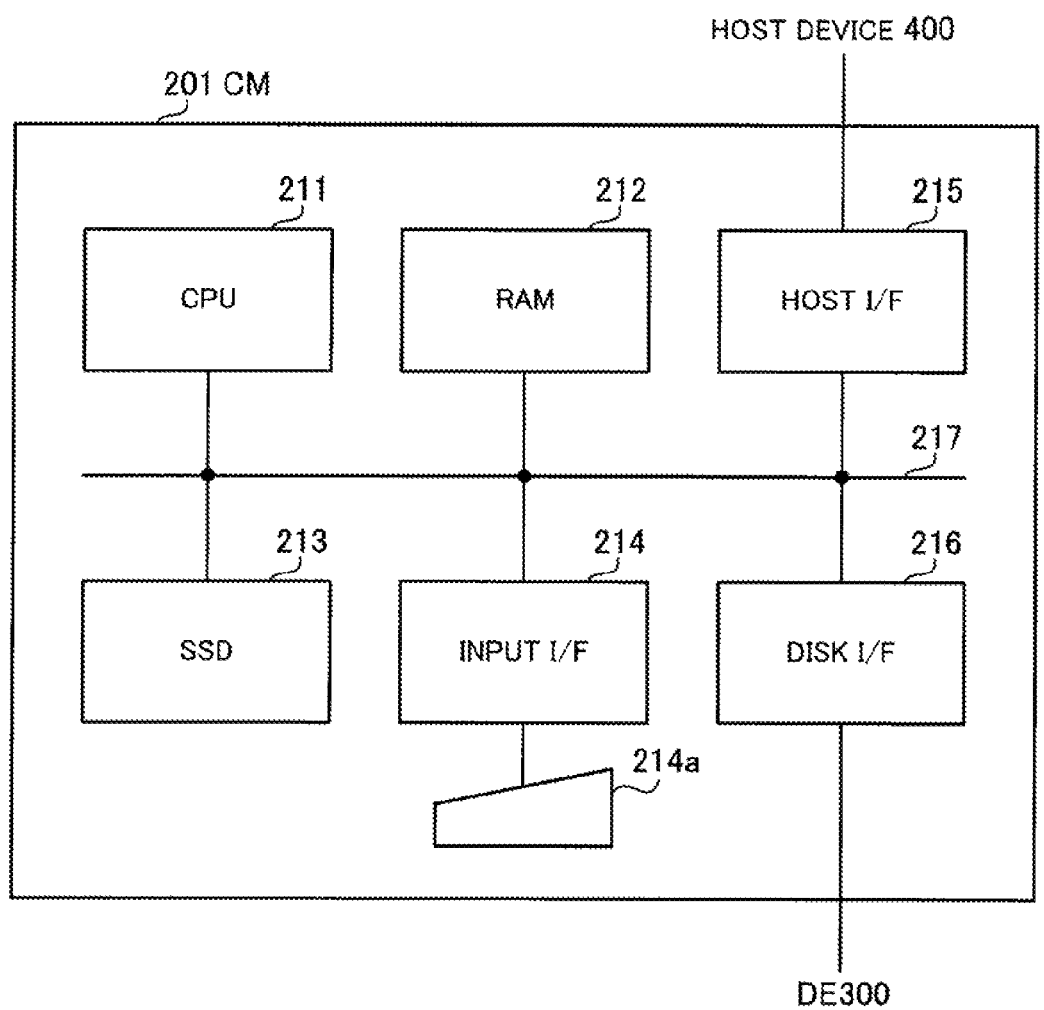
FIG. 3 illustrates an example of a hardware configuration of a controller module.

FIG. 3 illustrates an example of a hardware configuration of a CM. As for the CM 201, a CPU 211 exercises overall control over the entire CM 201. To the CPU 211, a random access memory (RAM) 212 and multiple peripherals are connected via a bus 217. The RAM 212 is used as a main storage device of the CM 201 and temporarily stores at least part of a program to be executed by the CPU 211 and various types of data required for processing implemented by the program. To the CPU 211, various peripherals such as an SSD 213, an input interface (I/F) 214, a host I/F 215, and a disk I/F 216 are connected. The SSD 213 is used as a secondary storage device of the CM 201 and stores the program to be executed by the CPU 211 and various types of data required for implementation of the program. Note that, as the secondary storage device, another type of nonvolatile storage device such as an HDD may be used. To the input I/F 214, an input device 214a equipped with operation keys and the like is connected. The input I/F 214 outputs, to the CPU 211, a signal according to an operational input to the input device 214a. The host I/F 215 carries out interface processing for transmitting and receiving data between the host device 400 and the CM 201. The host I/F 215 and the host device 400 communicate with each other according to, for example, Fibre Channel (FC) standards. The disk I/F 216 carries out interface processing for transmitting and receiving data between the DE 300 and the CM 201. The disk I/F 216 and the DE 300 communicate with each other according to, for example, the SAS (Serial Attached SCSI (small computer system interface)) standards.

Figure 4:
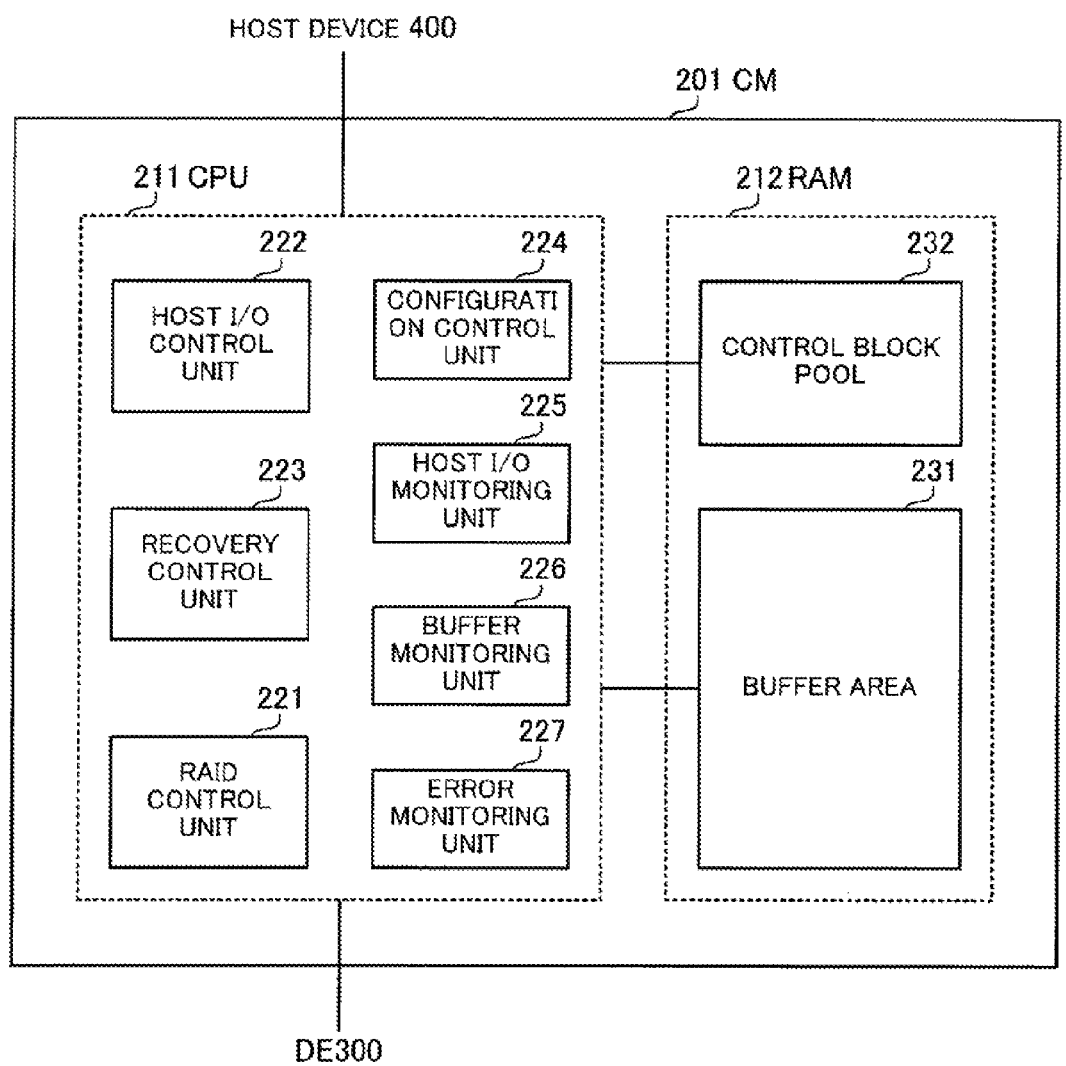
FIG. 4 is a block diagram illustrating a configuration example of a processing function of the controller module.

FIG. 4 is a block diagram illustrating a configuration example of a processing function of a CM. The CM 201 includes a RAID control unit 221, a host I/O control unit 222, a recovery control unit 223, a configuration control unit 224, a host I/O monitoring unit 225, a buffer monitoring unit 226, and an error monitoring unit 227. Processes of these individual units are achieved, for example, by the CPU 211 of the CM 201 executing a predetermined program. The RAID control unit 221 accesses an HDD of the DE 300 in response to a request from the host I/O control unit 222 or the recovery control unit 223. When making access to an HDD of the DE 300, the RAID control unit 221 performs access control based on setup information related to RAID set for an access destination area. Such setup information is registered in a RAID management table (to be described later) recorded in the SSD 213. In the RAID management table, setup information including a RAID level and the number of HDDs making up a corresponding RLU is recorded with respect to each RLU. Note that an RLU is a logical storage area configured by combining physical storage areas of multiple HDDs installed in the DE 300, and may be referred to also as a RAID group. For example, when receiving, from the host I/O unit 222, a data write request for writing data to an RLU, the RAID control unit 221 performs write processing in such a manner that the data is redundantly stored, based on information about the write destination RLU set in the RAID management table 241. Assume here that, for example, a write operation is performed with respect to an RLU having six disks (i.e., the number of disks, "6") and controlled by RAID 5. The RAID control unit 221 splits data received from the host I/O control unit 222, and records five successive pieces of the split data and parity based on the five pieces of the split data in such a manner as to be distributed to areas of the same stripe number in the six HDDs. The host I/O control unit 222 receives, from the host device 400, an I/O request (a read or write request) for an RLU. The host I/O control unit 222 requests the RAID control unit 221 to carry out I/O processing according to the received I/O request. Note that in the following description, I/O processing performed by the RAID control unit 221 in response to a request from the host device 400 is referred to as the "host I/O process". For example, in the case of receiving a read request from the host device 400, the host I/O control unit 222 notifies the RAID control unit 221 of an RLU and an address of a read source, and makes a data read request to the RAID control unit 221. The host I/O control unit 222 transmits data read by the RAID control unit 221 to the host device 400. On the other hand, the host I/O control unit 222 outputs, to the RAID control unit 221, write data received from the host device 400 and an RLU and an address of a write destination, and makes a data write request to the RAID control unit 221. When a write operation is normally carried out by the RAID control unit 221, the host I/O control unit 222 sends a normal response to the host device 400. The recovery control unit 223 requests the RAID control unit 221 to execute a rebuild process, a redundant copy process, and a copy back process and manages progress of each of the processes. The rebuild process is carried out when one of HDDs belonging to an RLU fails. In the rebuild process, data is read from non-failed HDDs belonging to the same RLU, then data of the failed HDD is reconstructed based on the read data, and the reconstructed data is written to a spare HDD (hot spare) or to an HDD which is a replacement of the failed HDD. The redundant copy process is carried out when a sign of failure of one of HDDs belonging to an RLU is detected. In the redundant copy process, data reading, reconstruction and writing operations similar to those in the rebuild process are performed without separating off the HDD from which the sign of failure has been detected. The copy back process is carried out when a failed HDD is replaced with a new HDD. In the copy back process, data stored in the hot spare in the rebuild process or the redundant copy process is written back to the newly replaced HDD. Hereinafter, these rebuild process, redundant copy process and copy back process are generically referred to as the "rebuild associated process". When causing the RAID control unit 221 to execute a rebuild associated process for an RLU, the recovery control unit 223 splits a storage area targeted for the rebuild associated process into sections of a fixed size. Subsequently, the recovery control unit 223 causes the RAID control unit 221 to execute the rebuild associated process for the RLU by sequentially requesting the RAID control unit 221 to carry out partial processes each of which includes a combination of an operation of reading data from one section of the given size and a write operation based on the read data. For example, in the case of an RLU controlled by one of RAID 4, 5 and 6, a partial process is achieved by executing a rebuild associated process with respect to each area having a fixed number of strips. On the other hand, in the case of an RLU controlled by RAID 1, a partial process is achieved by executing a rebuild associated process with respect to each area of a fixed size in each storage area to which mirroring is applied. Note that, in the case of requesting the rebuild process or redundant copy process among the rebuild associated processes, each partial process requested to the RAID control unit 221 includes a data reconstruction operation, if needed, between the data read operation and the data write operation. As described above, in the case of causing the RAID control unit 221 to execute a rebuild associated process for one RLU, the recovery control unit 223 makes, during the same period of time, multiple requests, each of which requests the RAID control unit 221 to carry out a partial process for an area of a fixed size. With this, it is possible to cause the RAID control unit 221 to carry out the requested multiple partial processes in parallel. In this manner, the partial processes are carried out in parallel, which reduces the time required for the rebuild associated process. In addition, the recovery control unit 223 is able to cause the RAID control unit 221 to execute rebuild associated processes for multiple RLUs in parallel. In this case, one or more partial processes for one RLU and one or more partial processes for another RLU are carried out in parallel by the RAID control unit 221. Further, the recovery control unit 223 is able to change multiplicity of partial processes for each RLU according to priority set for the RLU, an execution situation of a host I/O process, and usage of memory resources in the CM 201. With this, it is possible to speed up a rebuild associated process while reducing an influence on the performance of the host I/O process as much as possible.

The configuration control unit 224 manages a configuration of each RLU using the RAID management table 241. For example, in the case where failure of an HDD is detected by the error monitoring unit 227, the configuration control unit 224 updates the RAID management table 241, to thereby separate off the failed HDD from an RLU to which the failed HDD has belonged up to this point and also incorporate a hot spare into the RLU. In addition, in the case where failure of an HDD is detected, the configuration control unit 224 requests the recovery control unit 223 to execute a rebuild process. The host I/O monitoring unit 225 monitors one or more host I/O processes in progress (i.e., host I/O processes whose processing has not been completed). For example, the host I/O control unit 222 registers I/O request commands issued by the host device 400 in a command queue, and deletes, from the command queue, an I/O request command when a corresponding I/O process is completed. The host I/O monitoring unit 225 determines host I/O processes in progress by monitoring the command queue. Note that the command queue is stored, for example, in the RAM 212 of the CM 201. The host I/O monitoring unit 225 is able to notify the recovery control unit 223 of, for example, the presence or absence of host I/O processes in progress with respect to each RLU accessed. The buffer monitoring unit 226 monitors the usage of a buffer area 231. The buffer area 231 is a storage area used as a buffer at least by the RAID control unit 221, the host I/O control unit 222 and the recovery control unit 223, and is provided in the RAM 212. The buffer monitoring unit 226 is able to, for example, notify the recovery control unit 223 of the usage of the buffer area 231.

The error monitoring unit 227 monitors an error occurrence status of the HDDs in the DE 300. For example, the error monitoring unit 227 records, in the SSD 213 of the CM 201, the number of errors occurred when the RAID control unit 221 made access to HDDs with respect to each of the access destination HDDs. In addition, the error monitoring unit 227 may detect the occurrence of an error by periodically requesting the RAID control unit 221 to make access to the HDDs of the DE 300 in order to determine whether there is a failure. When the number of errors occurred in an HDD exceeds a predetermined threshold Th1, the error monitoring unit 227 notifies the configuration control unit 224 that a sign of failure occurrence of the HDD has been detected. In this case, the configuration control unit 224 requests the recovery control unit 223 to execute a redundant copy process for an RLU to which the HDD belongs. In addition, when the number of errors occurred in an HDD exceeds a threshold Th2, which is greater than the threshold Th1, the error monitoring unit 227 determines that a failure has occurred in the HDD and, then, notifies the configuration control unit 224 of the occurrence of a failure. In this case, the configuration control unit 224 requests the recovery control unit 223 to execute a redundant copy process for an RLU to which the HDD belongs.

Control data called "control blocks" is used to make process requests and responses, for example, between the host I/O control unit 222 and the RAID control unit 221, between the configuration control unit 224 and the recovery control unit 223, and between the recovery control unit 223 and the RAID control unit 221. A control block pool 232 of FIG. 4 is a storage area provided in the RAM 212 for registration of control blocks. Each control block stores a process name for identifying a process to be requested, information for identifying a process target, and the like. For example, in the case of requesting the RAID control unit 221 to carry out a read operation, the host I/O control unit 222 secures a control block and registers, in the secured control block, a process name indicating a read operation, an address for identifying a read source, and the like. The host I/O control unit 222 notifies the RAID control unit 221 of an ID for identifying the secured control block, to thereby request a process indicated by the control block.

Figure 5:
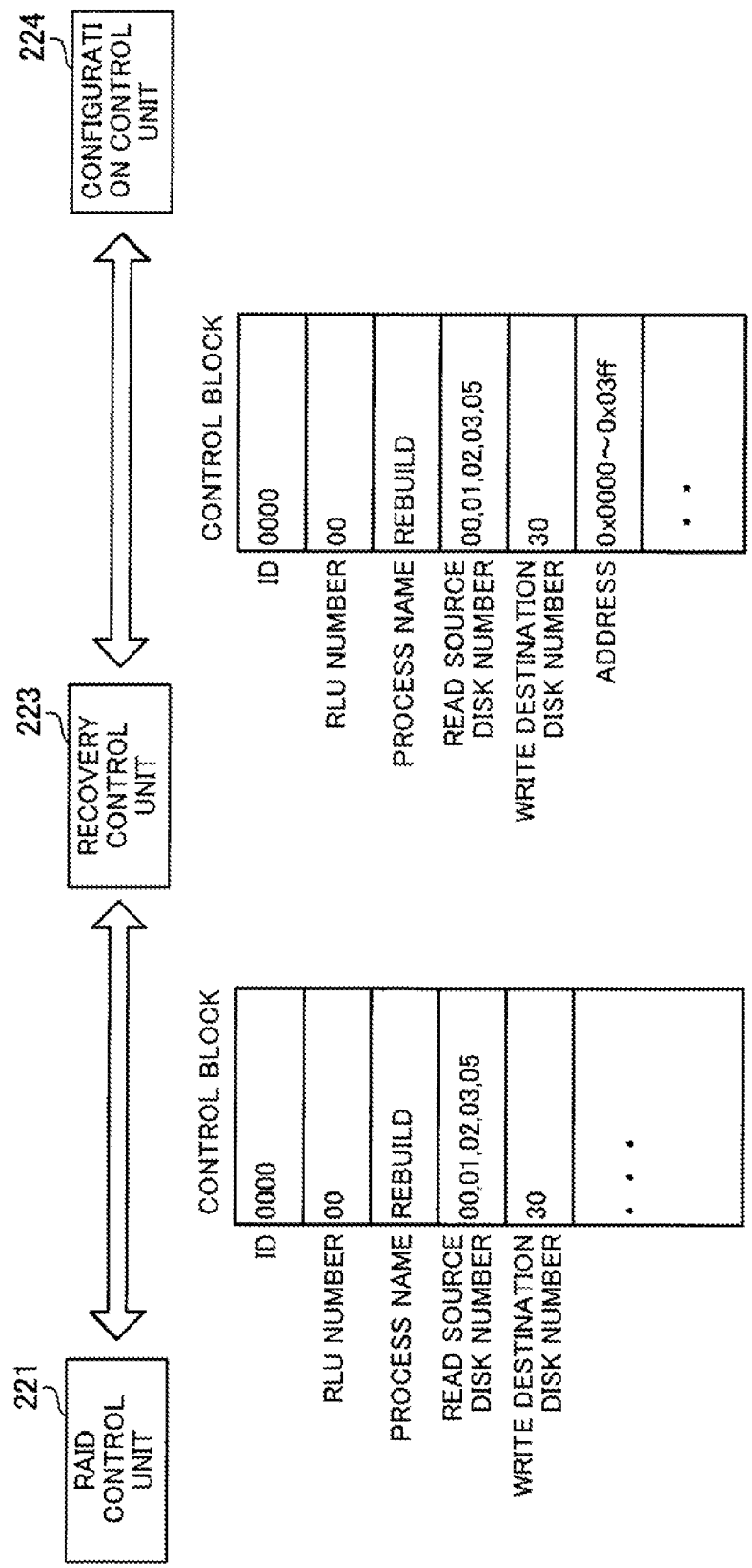
FIG. 5 illustrates configuration examples of control blocks generated at the time of execution of a rebuild associated process.

FIG. 5 illustrates configuration examples of control blocks generated at the time of execution of a rebuild associated process. A control block generated by the configuration control unit 224 to request the recovery control unit 223 to execute a rebuild associated process includes an ID, an RLU number, a process name, a read source disk number, and a write destination disk number. The ID is a number for identifying the control block. The RLU number indicates a process target RLU. The process name indicates the type of process to be requested. The read source disk number indicates a read source HDD in the process to be requested. The write destination disk number indicates a write destination HDD in the process to be requested. For a control block secured in the control block pool 232, the configuration control unit 224 sets an ID, an RLU number, a process name, a read source disk number, and a write destination disk number. Then, the configuration control unit 224 notifies the recovery control unit 223 of the ID and requests execution of a process indicated by the process name. Note that the ID may be an address of the control block in the control block pool 232. In response to the request, the recovery control unit 223 carries out a process corresponding to a control block indicated by the ID. When having completed the process corresponding to the control block, the recovery control unit 223 notifies the configuration control unit 224 of the ID of the control block as well as the completion of the process.

On the other hand, a control block generated by the recovery control unit 223 to request the RAID control unit 221 to carry out partial processes of a rebuild associated process includes an address (logical block address, LBA) indicating an area targeted for the partial processes, in addition to the above-described ID, RLU number, process name, read source disk number, and write destination disk number. Note that in the example of FIG. 5, the foremost LBA and the last LBA of the target area are set as the address. However, as another example, the foremost LBA and the number of blocks which indicates the size of the target area may be set instead. The recovery control unit 223 notifies the RAID control unit 221 of the ID of a control block in which the ID, RLU number, process name, read source disk number, write destination disk number and address are set, and requests execution of a process indicated by the process name. In response to the request, the RAID control unit 221 carries out a process corresponding to a control block indicated by the ID. When having completed the process corresponding to the control block, the RAID control unit 221 notifies the recovery control unit 223 of the ID of the control block as well as the completion of the process.

Note that there are two types of control blocks provided by the recovery control unit 223 to the RAID control unit 221: a control block acquired by the recovery control unit 223 itself; and a control block which is formed by the recovery control unit 223 adding an address to a control block acquired by the configuration control unit 224. In the latter case, the same ID is used for a control block acquired by the configuration control unit 224 and then provided to the recovery control unit 223 and for a control block provided by the recovery control unit 223 to the RAID control unit 221.

Figure 6:
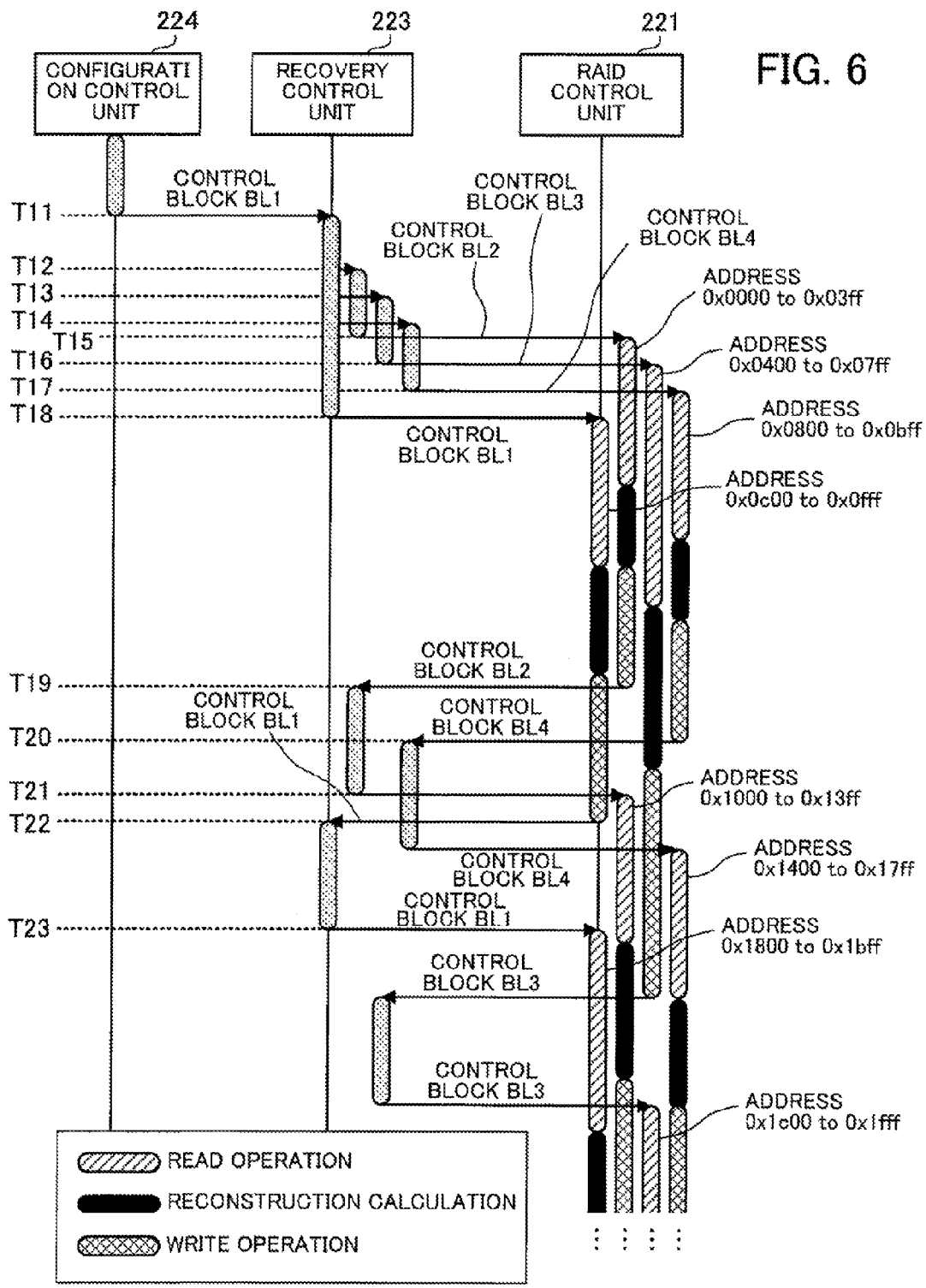
FIG. 6 is a sequence diagram illustrating a process example in which partial processes are multiply carried out based on control blocks.

FIG. 6 is a sequence diagram illustrating a process example in which partial processes are multiply carried out based on control blocks. According to the example of FIG. 6, a rebuild process for one RLU is executed. In addition, for the rebuild target RLU, data is to be redundantly stored using parity based on RAID 4, 5 or the like. The configuration control unit 224 secures a control block BL1 and notifies the recovery control unit 223 of the control block BL1, to thereby request the recovery control unit 223 to execute a rebuild process for a predetermined RLU (at a timing T11). In response to the request, the recovery control unit 223 determines multiplicity of partial processes allowed for the RLU according to procedures described below. The multiplicity here indicates the number of partial processes allowed to be carried out in parallel for the RLU.

Assume that it is determined that the multiplicity "4" is allowed for the RLU. The recovery control unit 223 notifies the RAID control unit 221 of four control blocks, to thereby request the RAID control unit 221 to carry out partial processes based on the individual control blocks. According to the example of FIG. 6, first, the recovery control unit 223 newly acquires three control blocks BL2, BL3, and BL4 (at timings T12, T13, and T14, respectively). Then, the recovery control unit 223 sets, with respect to the control blocks BL2, BL3, and BL4, addresses indicating areas targeted for the rebuild process in order starting from the foremost area of an entire target area. For example, an address "0x0000 to 0x03ff" is set in the block BL2, an address "0x0400 to 0x07ff" following the address "0x0000 to 0x03ff" is set in the control block BL3, and an address "0x0800 to 0x0bff" following the address "0x0400 to 0x07ff" is set in the control block BL4. Note that the expression "0x'XXXX'" indicates that 'XXXX' is expressed in hexadecimal notation.

The recovery control unit 223 notifies the RAID control unit 221 of the control blocks BL2, BL3, and BL4, in which the addresses have been set, and requests the RAID control unit 221 to carry out partial processes based on the individual control blocks BL2, BL3, and BL4 (at timings T15, T16, and T17, respectively). Further, the recovery control unit 223 sets an address "0x0c00 to 0x0fff", which indicates a subsequent area targeted for the rebuild process, in the fourth control block which is the control block BL1 notified of by the configuration control unit 224. Subsequently, the recovery control unit 223 notifies the RAID control unit 221 of the control block BL1 in which the address has been set, and requests the RAID control unit 221 to carry out a partial process based on the control block BL1 (at a timing T18).

The RAID control unit 221 carries out, in parallel, partial processes based on the individual control blocks BL2, BL3, BL4, and BL1 notified of by the recovery control unit 223. In each of the partial processes, the following three operations are sequentially performed: (1) a data read operation of reading data from an area, which is indicated by an address, in a non-failed HDD among HDDs belonging to the RLU; (2) a data reconfiguration operation of reconstructing, by calculation based on the read data, data stored in an area corresponding to the same address in a failed HDD; and (3) a data write operation of writing the reconstructed data to an area corresponding to the same address in a hot spare. For example, since a read source HDD of (1) and a write destination HDD of (3) are different, it is possible to carry out, while the write operation of (3) is being carried out based on one control block, the read operation (1) based on another control block. In addition, when the read operation (1) based on the control block is completed, it is possible to start the reconstruction operation (2) based on the same control block, as well as to ongoingly start the read operation (1) at the next area based on another control block. In this manner, by notifying the RAID control unit 221 of multiple control blocks to thereby cause the RAID control unit 221 to carry out partial processes based on the individual control blocks in parallel, it is possible to reduce the processing time required for the entire rebuild associated process for one RLU. In one partial process, a read source address of (1) is the same as a write destination address of (3). Thus, the operations whose read source and write destination are the same are included in a single partial process, and the RAID control unit 221 is requested to carry out such partial processes in parallel. This simplifies processing procedures of the recovery control unit 223 to request the parallel processes, and also simplifies processing of the RAID control unit 221 after receiving the request. For example, in the case where a RAID level set for the RLU is RAID 1, in the read operation (1), data is read from one non-failed HDD belonging to the RLU; the reconstruction operation (2) is skipped; and in the write operation (3), the data read from the single HDD is directly written to a hot spare. In the case where a copy back process is requested, in the reading operation (1), data is read from an area indicated by an address in a hot spare; the reconstruction operation (2) is skipped; and in the write operation (3), the data read from the hot spare is directly written to an area corresponding to the same address in a replaced HDD.

As described above, in response to a request from the configuration control unit 224 to execute a rebuild associated process, the recovery control unit 223 determines the multiplicity allowed for an appropriate RLU at that point in time and notifies the RAID control unit 221 of the same number of control blocks as the determined multiplicity. This allows partial processes to be carried out in parallel by the RAID control unit 221 with appropriate multiplicity determined at the time when the request for execution of the rebuild associated process is made.

Subsequently, when completing one partial process based on a control block, the RAID control unit 221 notifies the recovery control unit 223 of the ID of the control block, to thereby notify the recovery control unit 223 of the completion of the partial process. For example, in FIG. 6, when completing the partial process based on the control block BL2, the RAID control unit 221 notifies the recovery control unit 223 of the control block BL2, to thereby notify the completion of the partial process (at a timing T19). In response to the process completion notice, the recovery control unit 223 determines the multiplicity allowed for the RLU at that point in time according to procedures described below. Assume here that the multiplicity is "4". According to the example of FIG. 6, the recovery control unit 223 rewrites the address set in the control block BL2 to an address "0x1000 to 0x13ff" which indicates the foremost area of a process target area, for which partial processes have yet to be requested to the RAID control unit 221. Subsequently, the recovery control unit 223 notifies the RAID control unit 221 of the control block BL2 with the rewritten address, and requests the RAID control unit 221 to carry out a partial process based on the control block BL2 (at a timing T21). In response to the request, the RAID control unit 221 starts to carry out a partial process based on the control block BL2. Let us assume, however, that the multiplicity allowed for the RLU is "3" at the time when the process completion notice regarding the control block BL2 is received (the timing T19). The recovery control unit 223 determines that it is not possible to carry out another partial process, and therefore release the control block BL2. With this, the number of partial processes for the RLU carried out by the RAID control unit 221 in parallel is reduced to "3".

On the other hand, assume for example that the multiplicity allowed for the RLU is "5" at the time when the process completion notice regarding the control block BL1 is received (a timing T22, for example). The recovery control unit 223 acquires a new control block ("control block 5"). Then, the recovery control unit 223 sets an address "0x1000 to 0x13ff", which indicates the next process target area, in the newly acquired control block 5. Subsequently, the recovery control unit 223 notifies the RAID control unit 221 of the control block 5, and requests the RAID control unit 221 to carry out a partial process based on the control block 5. Further, the recovery control unit 223 rewrites the address set in the original control block BL2 to an address "0x1400 to 0x17ff", which indicates the next processing target area. Subsequently, the recovery control unit 223 notifies the RAID control unit 221 of the control block BL2 with the rewritten address, and requests the RAID control unit 221 to carry out a partial process based on the control block 2. With this, the number of partial processes for the RLU carried out by the RAID control unit 221 in parallel is increased to "5".

In the above described manner, the recovery control unit 223 determines the multiplicity allowed for the RLU at each time of receiving a response from the RAID control unit 221. Then, according to the outcome of the multiplicity determination, the recovery control unit 223 adjusts the number of partial processes carried out by the RAID control unit 221 in parallel. Accordingly, each time a partial process carried out by the RAID control unit 221 is completed, the number of partial processes carried out by the RAID control unit 221 in parallel is optimized.

Note that, as illustrated in FIG. 6, partial processes carried out by the RAID control unit 221 are not always completed in the order of requests made by the recovery control unit 223. For example, in FIG. 6, when the partial process based on the control block BL4 is completed (a timing T20), the partial process based on the control block BL3 has yet to be completed. In such a case, if a partial process based on the next control block is delayed to be carried out until the partial process based on the control block BL3 is completed, the time required for the rebuild associated process increases by the wait time. Accordingly, when receiving a response from the RAID control unit 221, the recovery control unit 223 does not wait for other partial processes to be completed and determines the multiplicity allowed at that point in time. Then, if it is possible to cause another partial process to be carried out, the recovery control unit 223 notifies the RAID control unit 221 of a control block, to thereby cause the RAID control unit 221 to start a partial process for the next area. In the example of FIG. 6, when receiving a completion notice of the partial process based on the control block BL4 (the timing T20), the recovery control unit 223 does not wait for the partial process based on the control block BL3 to be completed and determines the multiplicity allowed at that point in time. Then, in the case, for example, where the multiplicity is "4", the recovery control unit 223 rewrites the address of the control block BL4 to the address "0x1400 to 0x17ff", which indicates the next area. Subsequently, the recovery control unit 223 notifies the RAID control unit 221 of the control block BL4 with the rewritten address and requests the RAID control unit 221 to carry out a partial process based on the control block BL4. According to the above-described procedures, it is possible to speed up a rebuild associated process for a process target area with no effect from a partial process requiring a longer processing time than other partial processes, which reduces the processing time required for the entire rebuild associated process.

As for control blocks, addresses are set in the order that the RAID control unit 221 is notified of the control blocks, starting from the foremost area of the process target area. That is, the order that the RAID control unit 221 is notified of the control blocks at an earlier stage when the execution of the rebuild associated process is requested by the configuration control unit 224 does not matter. With this, the recovery control unit 223 does not have to manage correspondence between the order that the control blocks are notified of and the order that partial processes based on the control blocks notified of are completed, and simply sets addresses sequentially in the order that the partial processes are completed. As a result, the procedures of the recovery control unit 223 are simplified and the processing load is reduced. In addition, read addresses and write addresses in each of the read source and write destination HDDs belonging to a single RLU are set sequentially, without the order being changed during the procedures. This speeds up read and write operations of each HDD.

Figure 7:
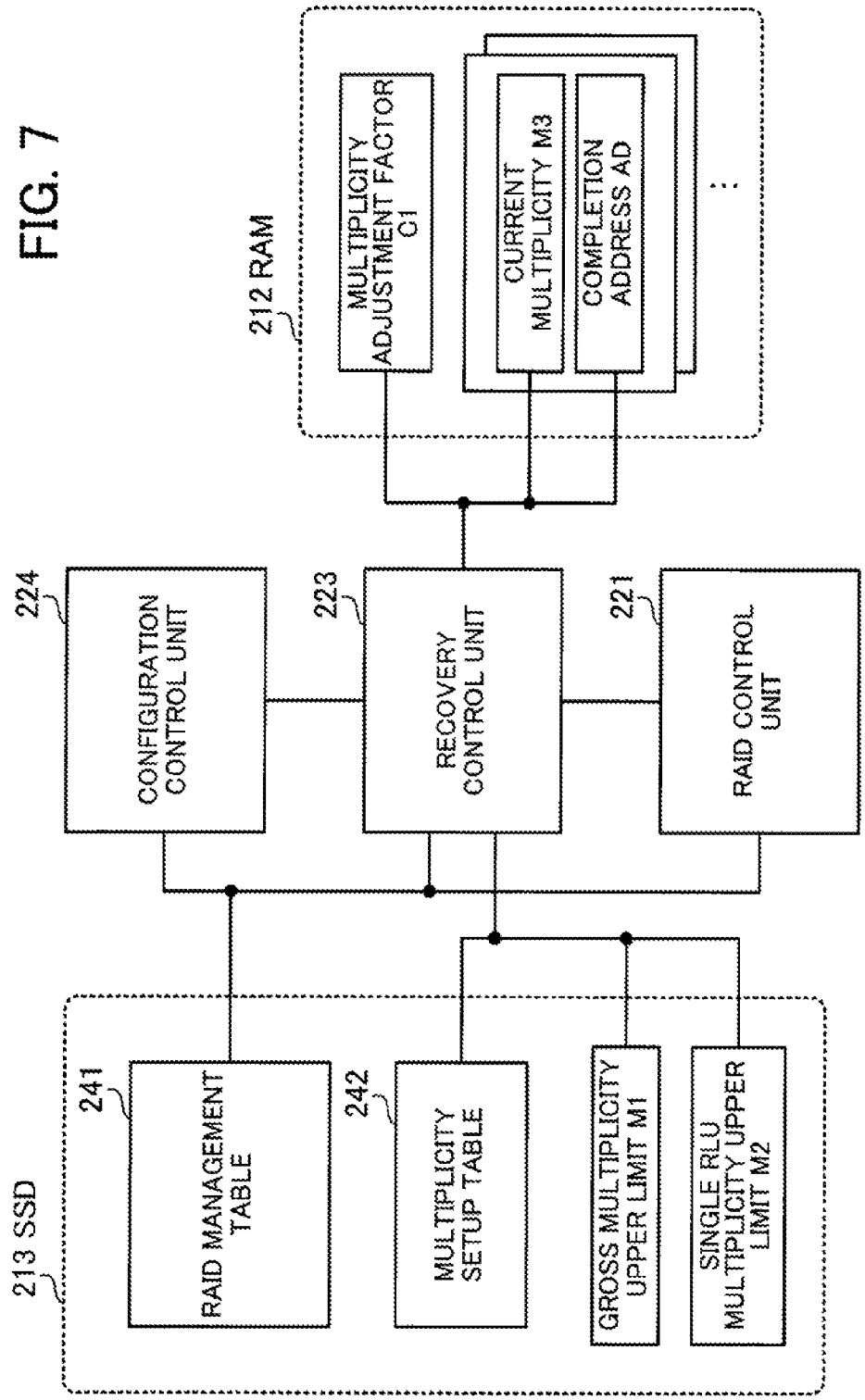
FIG. 7 illustrates an example of main information referred to at the time of execution of the rebuild associated process.

Next, FIG. 7 illustrates an example of main information referred to at the time of execution of a rebuild associated process. The SSD 213 of the CM 201 stores the RAID management table 241 and a multiplicity setup table 242. The RAID management table 241 includes configuration information regarding RLUs. The configuration control unit 224 registers and updates information for the RAID management table 241. In addition, the RAID management table 241 is referred to by the RAID control unit 221 and the recovery control unit 223. The multiplicity setup table 242 includes predetermined multiplicity upper limits (configuration-specific multiplicity upper limits) for individual RAID configurations. The multiplicity setup table 242 is referred to by the recovery control unit 223 to determine the number of control blocks acquirable for each RLU.

Figure 8:
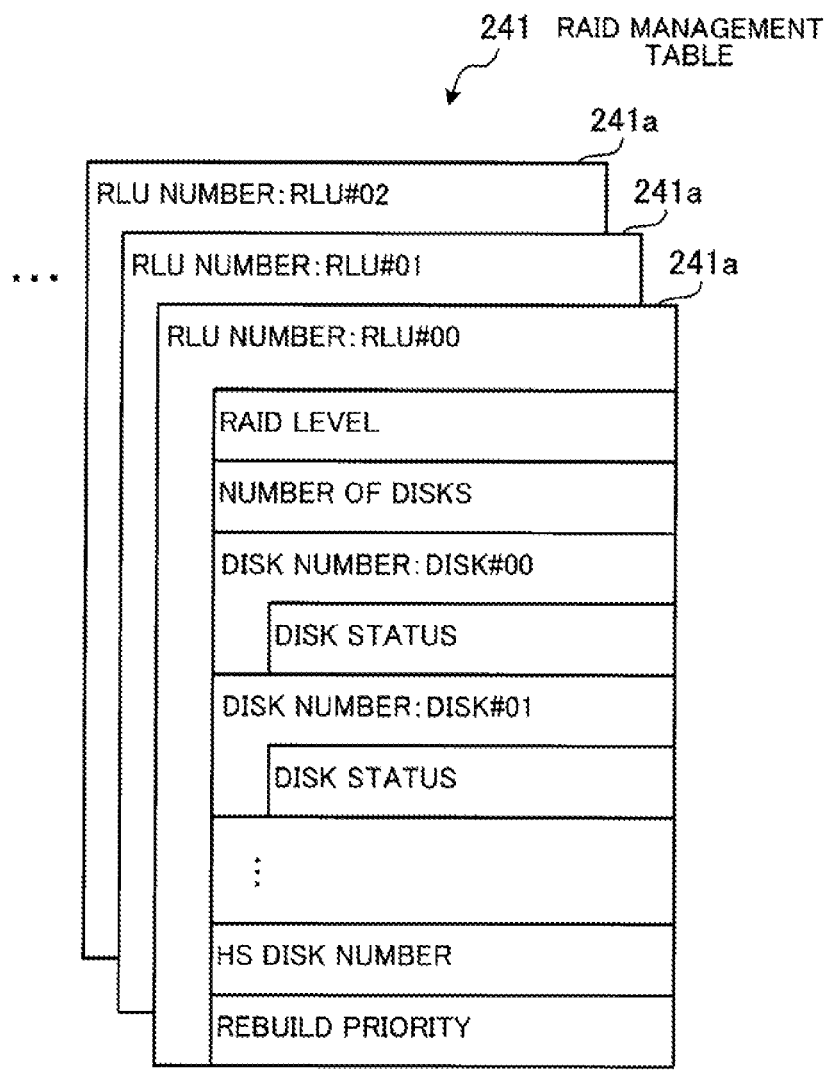
FIG. 8 illustrates an example of information registered in a RAID management table.

FIG. 8 illustrates an example of information registered in a RAID management table. In the RAID management table 241, records 241a are registered by the configuration control unit 224 with respect to individual RLUs. To each of the records 241a, an RLU number identifying a corresponding RLU is appended. In addition, in each of the records 241a, "RAID level", "number of disks", "disk number", "HS disk number", and "rebuild priority" are registered. "RAID level" indicates a RAID level set for a corresponding RLU. "Number of disks" indicates the number of HDDs belonging to the RLU. "Disk number" indicates an identification number of an HDD belonging to the RLU. The same number of "disk number" items as the number set in "number of disks" are registered to the record 214a. For each HDD identified by a corresponding "disk number", "disk status" is registered. "Disk status" indicates an operating status of a corresponding HDD. In "disk status", one of "normal", "failed", and "saved in HS (hot space)", for example, is set. "Normal" indicates that the HDD functions normally, and "failed" indicates that the HDD is failed. "Saved in HS" indicates that a rebuild process, in which data originally recorded in the HDD is stored in the hot spare, has been completed and the RLU operates with the hot spare incorporated. Note that "disk status" may be registered, for example, in a disk management table including information of each HDD, which disk management table is provided separately from the RAID management table 241. "HS disk number" is set before execution of a rebuild process or a redundant copy process, and indicates a number for identifying a hot spare HDD, which is a write destination of data in the rebuild process or the redundant copy process.

On receiving an HDD failure notice from the error monitoring unit 227, the configuration control unit 224 extracts the record 241a of an RLU to which the failed HDD belongs, and updates "disk status" of the failed HDD from "normal" to "failed", to thereby separate off the failed HDD from the RLU. Further, the configuration control unit 224 sets the disk number of an HDD used as a hot spare in "HS disk number". The configuration control unit 224 requests the recovery control unit 223 to execute a rebuild process or a copy back process with respect to an RLU corresponding to the record 241a in which such setting changes have been made. On the other hand, in the case where an HDD for which a sign of failure has been detected is notified of by the error monitoring unit 227, the configuration control unit 224 leaves "disk status" of the HDD notified of to "normal" (that is, the HDD remains to be incorporated in the RLU), and requests the recovery control unit 223 to execute a redundant copy process with respect to an RLU to which the notified HDD belongs. Note that the RAID management table 241 is also referred to by the RAID control unit 221. For example, when executing a host I/O process, the RAID control unit 221 refers to one of the records 241a of the RAID management table 241, which record 241a corresponds to an RLU targeted for the I/O process. The RAID control unit 221 executes the I/O process according to the RAID level, number of disks, and disk number set in the record 241a to which the RAID control unit 221 refers. On receiving a request for execution of a rebuild associated process from the recovery control unit 223, the RAID control unit 221 refers to one of the records 241a in the RAID management table 241, which record 241a corresponds to an RLU number indicated in a control block notified of by the recovery control unit 223. Based on a RAID level registered in the record 241a to which the RAID control unit 221 refers and a read source disk number and a write destination disk number set in the control block notified of by the recovery control unit 223, the RAID control unit 221 determines details of processing content to be carried out. For example, in the case where a rebuild process is requested, the RAID control unit 221 executes, based on the RAID level registered in the record 241a, a process corresponding to the RAID configuration, such as determining whether to perform data reconstruction calculation.

In the RAID management table 241 of FIG. 8, "rebuild priority" indicates priority of a rebuild associated process, which priority is appended to a corresponding RLU. "Rebuild priority" may be arbitrarily set according to an operation input by a user. In "rebuild priority", one of "high" and "low", for example, is set. "Rebuild priority" is referred to by the recovery control unit 223 to determine the multiplicity of partial processes allowed for each RLU. As described below, in the case where a host I/O process for an RLU targeted for a rebuild associated process is in progress, or in the case where the processing load of the CM 201 is high (i.e., in the case where use of memory resources is greater than or equal to a predetermined amount), the recovery control unit 223 reads "rebuild priority" associated with the RLU targeted for the rebuild associated process. In the case where "high" is set in "rebuild priority", the recovery control unit 223 recognizes an upper limit of the multiplicity according to the configuration of the RLU based on the multiplicity setup table 242, and sets the multiplicity of partial processes in such a manner as to come closer to the recognized upper limit of the multiplicity. On the other hand, in the case where "low" is set in "rebuild priority", the recovery control unit 223 controls not to multiply execute partial processes for the RLU.

FIG. 9 illustrates an example of information registered in a multiplicity setup table. In the multiplicity setup table 242, upper limits of the multiplicity of partial processes for one RLU are registered, which upper limits are predetermined according to RAID configurations. Such upper limits of the multiplicity are referred to as "configuration-specific multiplicity upper limits". According to the example of FIG. 9, each RAID configuration is identified by the combination of a RAID level set for an RLU and the number of disks belonging to the RLU, and a configuration-specific multiplicity upper limit is registered with respect to each combination. The configuration-specific multiplicity upper limits are preliminarily calculated with respect to individual RAID configurations in such a manner that the degree of influence to the performance of a host I/O process becomes comparable when each of the RAID configurations is applied. For example, in the case where the number of disks belonging to an RLU is the same, it is considered that RAID 4 and 5 with parity requires a high processing load than RAID 1 which does not use parity. Therefore, if the number of disks belonging to an RLU is the same, the configuration-specific multiplicity upper limit for RAID 4 and 5 is set smaller than the configuration-specific multiplicity upper limit for RAID 1. In addition, it is considered that, in the same RAID level, the processing load increases as the number of disks increases. Accordingly, in the same RAID level, a configuration-specific multiplicity upper limit is set smaller as the number of disks increases. Now description is given, referring back to FIG. 7. In the SSD 213, a gross multiplicity upper limit M1 and a single RLU multiplicity upper limit M2 are preliminarily stored as values to which the recovery control unit 223 refers. The gross multiplicity upper limit M1 indicates upper limit multiplicity of partial processes in a rebuild associated process, executable by the entire CM 201. The single RLU multiplicity upper limit M2 indicates upper limit multiplicity of partial processes in a rebuild associated process, executable for one RLU. A smaller value is set to the single RLU multiplicity upper limit M2 than the gross multiplicity upper limit M1. In addition, the recovery control unit 223 carries out processing as referring to a multiplicity adjustment factor C1, current multiplicity M3, and a completion address AD, all of which are individually stored in the RAM 212. The multiplicity adjustment factor C1 is a factor commonly applied to all RLUs for which rebuild associated processes are being executed. The multiplicity adjustment factor C1 is used, at the time of determining the multiplicity of partial processes, to make adjustment so that the sum of the multiplicity of partial processes for the individual RLUs does not exceed the gross multiplicity upper limit M1. Note that the multiplicity adjustment factor C1 is larger than 0 and smaller than or equal to 1, and is increased or decreased with a predetermined change interval of, for example, 0.1. In addition, for example, when the CM 201 starts up or when processing of the recovery control unit 223 is started after the start-up of the CM 201, the multiplicity adjustment factor C1 is set to an initial value of "1". Both the current multiplicity M3 and the completion address AD are individually set with respect to each RLU for which a rebuild associated process is being executed. The current multiplicity M3 indicates the number of partial processes currently being executed for a corresponding RLU (that is, the number of control blocks currently secured for the RLU). The completion address AD is an address indicating, within the entire area targeted for a rebuild associated process for a corresponding RLU, the last area for which execution of a partial process has been completed.

Figure 10:
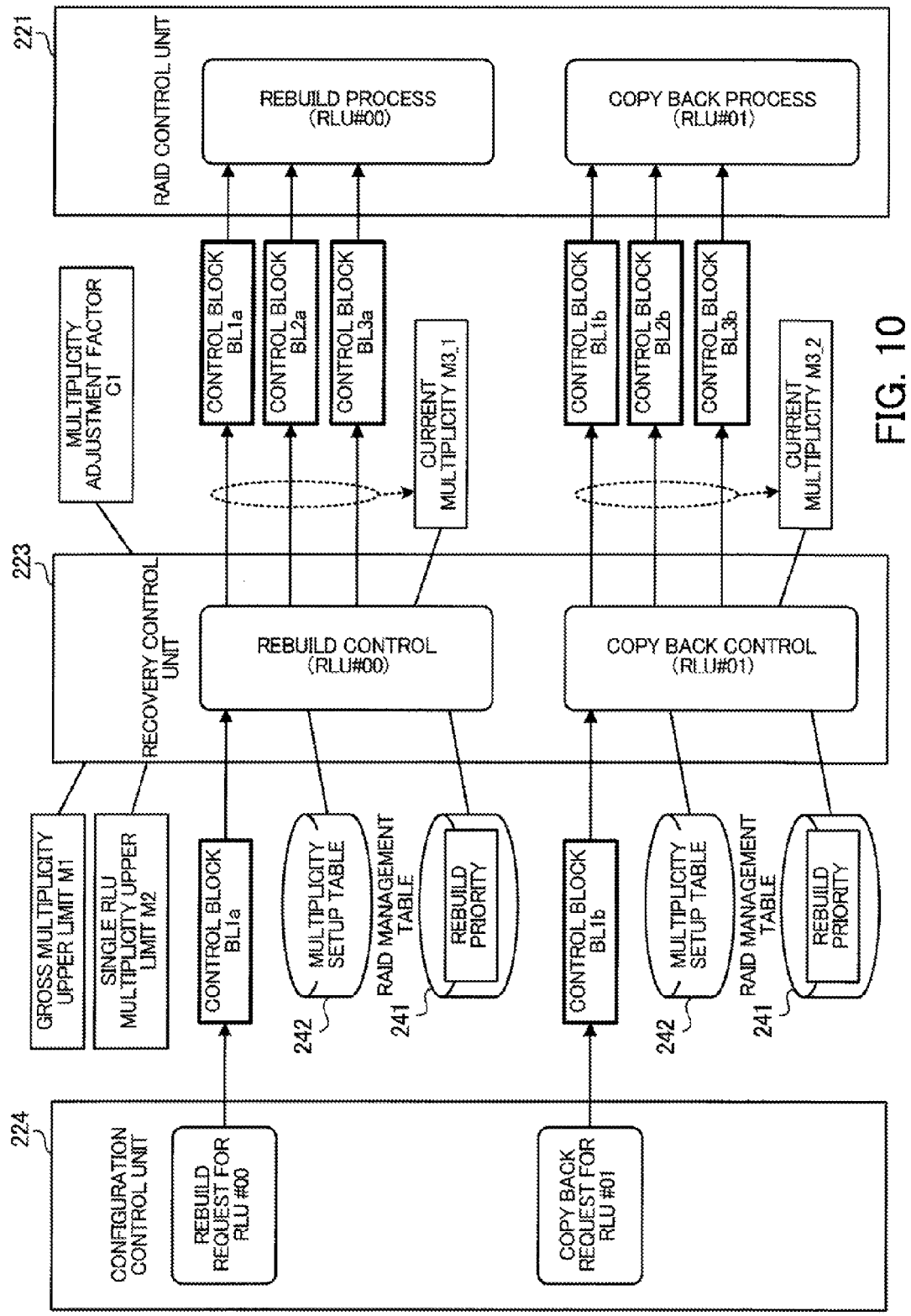
FIG. 10 illustrates a situation in which rebuild associated processes for two RLUs are being executed.

Next, FIG. 10 illustrates a situation in which rebuild associated processes for two RLUs are being executed. The following describes, with reference to the example of FIG. 10, procedures for adjusting the multiplicity of partial processes by the recovery control unit 223. FIG. 10 illustrates, as an example, a situation in which a rebuild process for an RLU with an RLU number "00" (hereinafter, referred to as "RLU #00") and a copy back process for an RLU with an RLU number "01" ("RLU #01") are being executed. According to the procedures described in FIG. 6, the configuration control unit 224 notifies the recovery control unit 223 of a control block BL1a, to thereby request the recovery control unit 223 to execute a rebuild process for RLU #00. Assume, for example, that multiplicity "3" is allowed for RLU #00. The recovery control unit 223 notifies the RAID control unit 221 of control blocks BL1a, BL2a, and BL3a, to thereby cause the RAID control unit 221 to carry out partial processes based on the individual control blocks in parallel. In addition, the configuration control unit 224 notifies the recovery control unit 223 of a control block BL1b, to thereby request the recovery control unit 223 to execute a copy back process for RLU #01. Assume, for example, that multiplicity "3" is allowed for RLU #01. The recovery control unit 223 notifies the RAID control unit 221 of control blocks BL1b, BL2b, and BL3b, to thereby cause the RAID control unit 221 to carry out partial processes based on the individual control blocks in parallel. As described above, the RAID control unit 221 is notified of the control blocks BL1a, BL2a, BL3a, BL1b, BL2b, and BL3b from the recovery control unit 223. With this, the RAID control unit 221 carries out partial processes based on the individual control blocks BL1a, BL2a, BL3a, BL1b, BL2b, and BL3b in parallel. Thus, the RAID control unit 221 is able to carry out, in parallel, not only partial processes for one RLU but also partial processes for multiple RLUs.

Basically, the recovery control unit 223 sets, with respect to each RLU, the multiplicity of partial processes within a range not exceeding the single RLU multiplicity upper limit M2. In addition, the recovery control unit 223 controls the sum of the multiplicity set for all RLUs, for which rebuild associated processes are being executed, not to exceed the gross multiplicity upper limit M1. According to the situation of FIG. 10 above, current multiplicity M3_1 for RLU #00 is "3" and current multiplicity M3_2 for RLU #01 is "3". Therefore, the recovery control unit 223 sets the multiplicity of partial processes in such a manner that a value (M3_1+M3_2) does not exceed the gross multiplicity upper limit M1.

The recovery control unit 223 dynamically adjusts the multiplicity of partial processes in the following manner. The recovery control unit 223 adjusts the multiplicity of partial processes according to a situation of host I/O processes. The situation of host I/O processes is monitored by the host I/O monitoring unit 225 with respect to each RLU. As for an RLU for which a rebuild associated process is being executed, the recovery control unit 223 reduces the multiplicity of partial process for the RLU in the case where a host I/O process is in progress, compared to the case where no host I/O process is in progress. With this, the multiplicity is adjusted in such a manner that the speed of the host I/O process is reduced as little as possible due to the influence of the rebuild associated process. In addition, the recovery control unit 223 adjusts the multiplicity of partial process according to the usage of memory resources in the CM 201. The usage of memory resources in the CM 201 is monitored by the buffer monitoring unit 226. The buffer area 231 is commonly used by at least the RAID control unit 221, the host I/O control unit 222, and the recovery control unit 223. Therefore, in the case of, for example, determining the multiplicity allowed for a rebuild associated process for an RLU, the recovery control unit 223 is able to determine the size of processing load caused by host I/O processes, or the like, for other RLUs by detecting the usage of the buffer area 231 even when no host I/O process for the same RLU is in progress. In the case where the usage of the buffer area 231 exceeds a predetermined threshold, the recovery control unit 223 reduces the multiplicity of partial processes set for all RLUs, for which rebuild associated processes are being executed, compared to the case where the usage of the buffer area 231 is less than or equal to the threshold.

In the case where, for example, no host I/O process for RLU #00 is in progress in FIG. 10 and the usage of the buffer area 231 is less than or equal to the threshold, the recovery control unit 223 controls the multiplicity for RLU #00 to come closer to the single RLU multiplicity upper limit M2. It is considered not necessary to take into account the influence of the rebuild associated process for RLU #00 over the performance of a host I/O process in the case where no host I/O process for RLU #00 is in progress and the usage of the buffer area 231 is less than or equal to the threshold. Therefore, under such conditions, the fixed single RLU multiplicity upper limit M2 may be used as the multiplicity upper limit regardless of the RAID configuration of RLU #00. On the other hand, in the case where a host I/O process for #00 is in progress, or in the case where the usage of the buffer area 231 exceeds the threshold, the recovery control unit 223 sets the multiplicity upper limit for RLU #00 to a corresponding configuration-specific multiplicity upper limit acquired from the multiplicity setup table 242. Under such conditions, the multiplicity upper limit for RLU #00 is set according to the RAID configuration of RLU #00. The multiplicity upper limit set in such a case is less than the gross multiplicity upper limit M1.

In addition, if the rebuild priority set for RLU #00 is "low" in the case where a host I/O process for #00 is in progress or in the case where the usage of the buffer area 231 exceeds the threshold, the multiplicity upper limit is set lower, compared to the case where the rebuild priority is "high". According to this embodiment, in the case where the rebuild priority is "low", the multiplicity is set to "1" and partial processes for the RLU are not carried out in parallel. Thus, by adjusting the multiplicity according to the rebuild priority, higher multiplicity is set for an RLU to which higher priority is given so as to increase the speed of the rebuild associated process. Assume here that, for example, the single RLU multiplicity upper limit M2 is "3" and the gross multiplicity upper limit M1 is "6" or more. Under the conditions, if the usage of the buffer area 231 is less than or equal to the threshold and no host I/O process for either RLU #00 or #01 is in progress, the multiplicity for both RLUs #00 and #01 is set to "3", as illustrated in FIG. 10. In this case, since there is no need to take into account the influence over the performance of a host I/O process, control is exercised in such a manner that the rebuild associated process for each of RLUs #00 and #01 is executed at the highest speed.

Next considered is a case in which, for example, after the above-described condition, a partial process for RLU #00 based on the control block BL3a and a partial process for RLU #01 based on the control block BL3b are finished consecutively. Assume here that the rebuild priority is "high" for both RLUs #00 and #01. For example, in the case where the usage of the buffer area 231 exceeds the threshold both at the end of the partial process based on the control block BL3a and at the end of the partial process based on the control block BL3b, the recovery control unit 223 reduces the multiplicity for both RLUs #00 and #01 to values less than the single RLU multiplicity upper limit M2 (that is, values obtained from the multiplicity setup table 242). Thus, in the case where the usage of the buffer area 231 exceeds the threshold, the multiplicity for all RLUs is controlled to be less than the single RLU multiplicity upper limit M2. More specifically, in the case where the processing load of the entire CM 201 is considered to be high, the multiplicity for all RLUs, for which rebuild associated processes are being executed, is reduced across the board so as to reduce the processing load of the entire rebuild associated process, which results in reducing the processing load of the entire CM 201.

On the other hand, in the case where the usage of the buffer area 231 remains less than or equal to the threshold both at the end of the partial process based on the control block BL3a and at the end of the partial process based on the control block BL3b, the following procedures may be carried out. First, in the case where a host I/O process for RLU #00 is in progress at the end of the partial process based on the control block BL3a, the recovery control unit 223 controls the multiplicity for RLU #00 to be less than the single RLU multiplicity upper limit M2 (that is, a value corresponding to the configuration of RLU #00, acquired from the multiplicity setup table 242). For example, the recovery control unit 223 releases the control block BL3a, to thereby reduce the multiplicity for RLU #00 from "3" to "2". With this, the speed of the rebuild associated process for RLU #00 is reduced so that the influence on the performance of the host I/O process in progress is minimized, and the processing load is reduced. Note that if the rebuild priority for RLU #00 is "low", the multiplicity for RLU #00 is reduced even further. Subsequently, in the case where no host I/O process for RLU #01 is in progress when the partial process based on the control block BL3b is finished, the recovery control unit 223 does not reduce the multiplicity for RLU #01, which is therefore maintained at the single RLU multiplicity upper limit M2, i.e., "3". Even if a host I/O process for RLU #00 is in progress when the partial process based on the control back BL3b is finished, the recovery control unit 223 also maintains the multiplicity for RLU #01 at "3". Thus, when a host I/O process is being executed in parallel during execution of a rebuild associated process, the multiplicity is preferentially reduced for, among RLUs for which rebuild associated processes are being executed, an RLU for which the host I/O process is being executed. With this, the combined processing load of the host I/O process and the rebuild associated process is controlled not to be disproportionally placed on the particular RLU.

As described above, the recovery control unit 223 recognizes a multiplicity upper limit to be set for each RLU according to the host I/O processing situation, the usage of the buffer area 231, and the rebuild priority for the RLU as well as according to the RAID configuration of the RLU. However, if the recognized multiplicity upper limit is applied to all RLUs, for which rebuild associated processes are being executed, the sum of the multiplicity set for all the RLUs may exceed the gross multiplicity upper limit M1. In view of this, the recovery control unit 223 multiplies the multiplicity upper limit allowed for each RLU by the multiplicity adjustment factor C1, which is common to all the RLUs. This reduces the multiplicity to be set for all the RLUs at an equal rate, to thereby keep the sum of the multiplicity less than or equal to the gross multiplicity upper limit M1. Assume for example that, in FIG. 10, the usage of the buffer area 231 is less than or equal to the threshold and no host I/O process for either RLU #00 or #01 is in progress. In this case, the recovery control unit 223 recognizes that the multiplicity upper limit applicable for each of RLUs #00 and #01 is the single RLU multiplicity upper limit M2 (=3). However, if the multiplicity for RLUs #00 and #01 is set to "3" in the case where the gross multiplicity upper limit M1 is, for example, "4", the sum of the multiplicity becomes "6", exceeds the gross multiplicity upper limit M1. Here, the multiplicity to be set for RLUs #00 and #01 is denoted as M4_1 and M4_2, respectively. In the case where the sum of the multiplicity exceeds the gross multiplicity upper limit M1, the recovery control unit 223 adjusts the multiplicity adjustment factor C1 in such a manner that a value of C1×(M4_1+M4_2) becomes less than or equal to the gross multiplicity upper limit M1 (=4) when M4_1=M4_2=3. According to this example, since C1=⅔, the recovery control unit 223 sets the multiplicity for each of RLUs #00 and #01 to "2", which is obtained by multiplying the allowable upper limit "3" by C1=⅔. Thus, by using the multiplicity adjustment factor C1, it is possible to reduce the sum of the multiplicity while maintaining a ratio between multiplicity upper limits determined with respect to individual RLUs as much as possible, to thereby control the processing load of the CM 201 not to increase above a certain level. Each time the recovery control unit 223 is requested by the configuration control unit 224 to execute a rebuild associated process, and each time the recovery control unit 223 receives a completion notice of a partial process from the RAID control unit 221, the recovery control unit 223 makes a multiplicity adjustment as described above according to the situation at that point in time.

Figure 11:
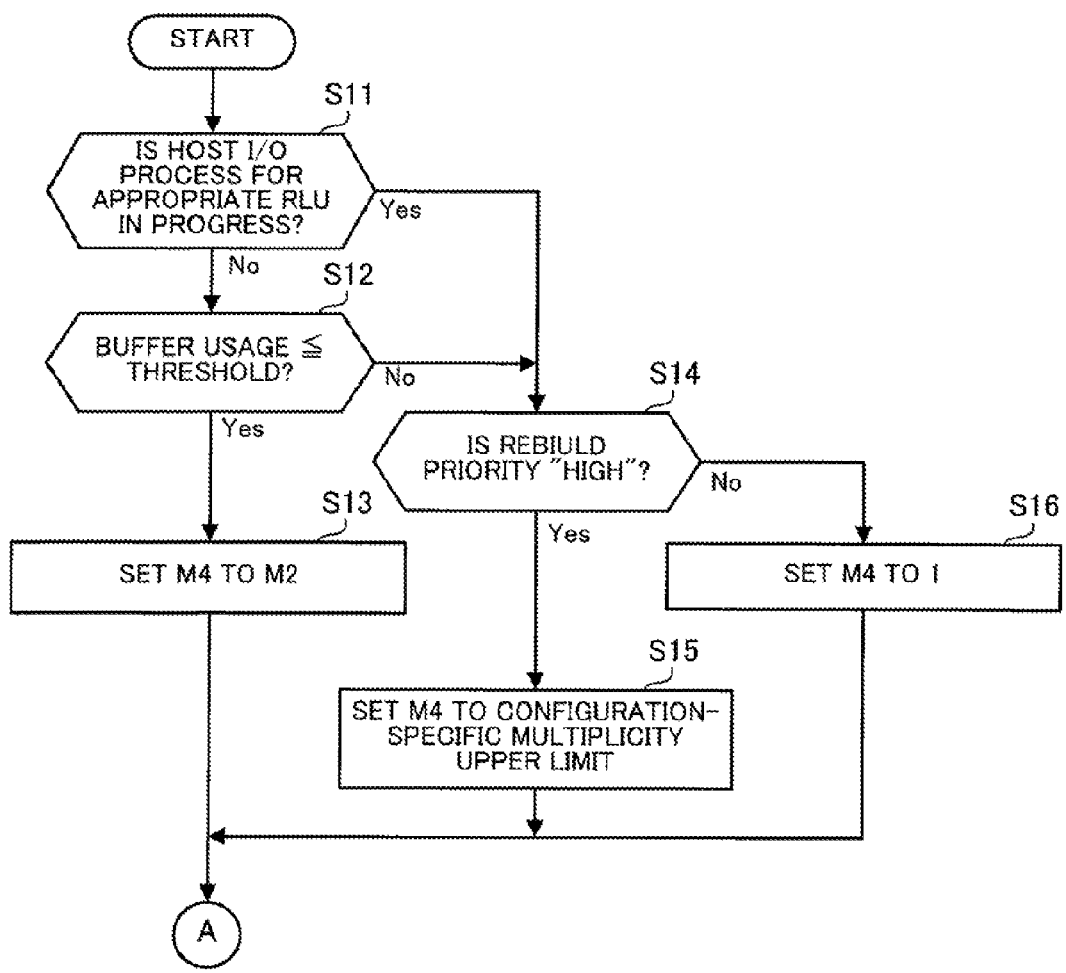
FIG. 11 is a first flowchart illustrating an example of procedures performed by a recovery control unit at the time of requesting execution of partial processes.
Figure 12:
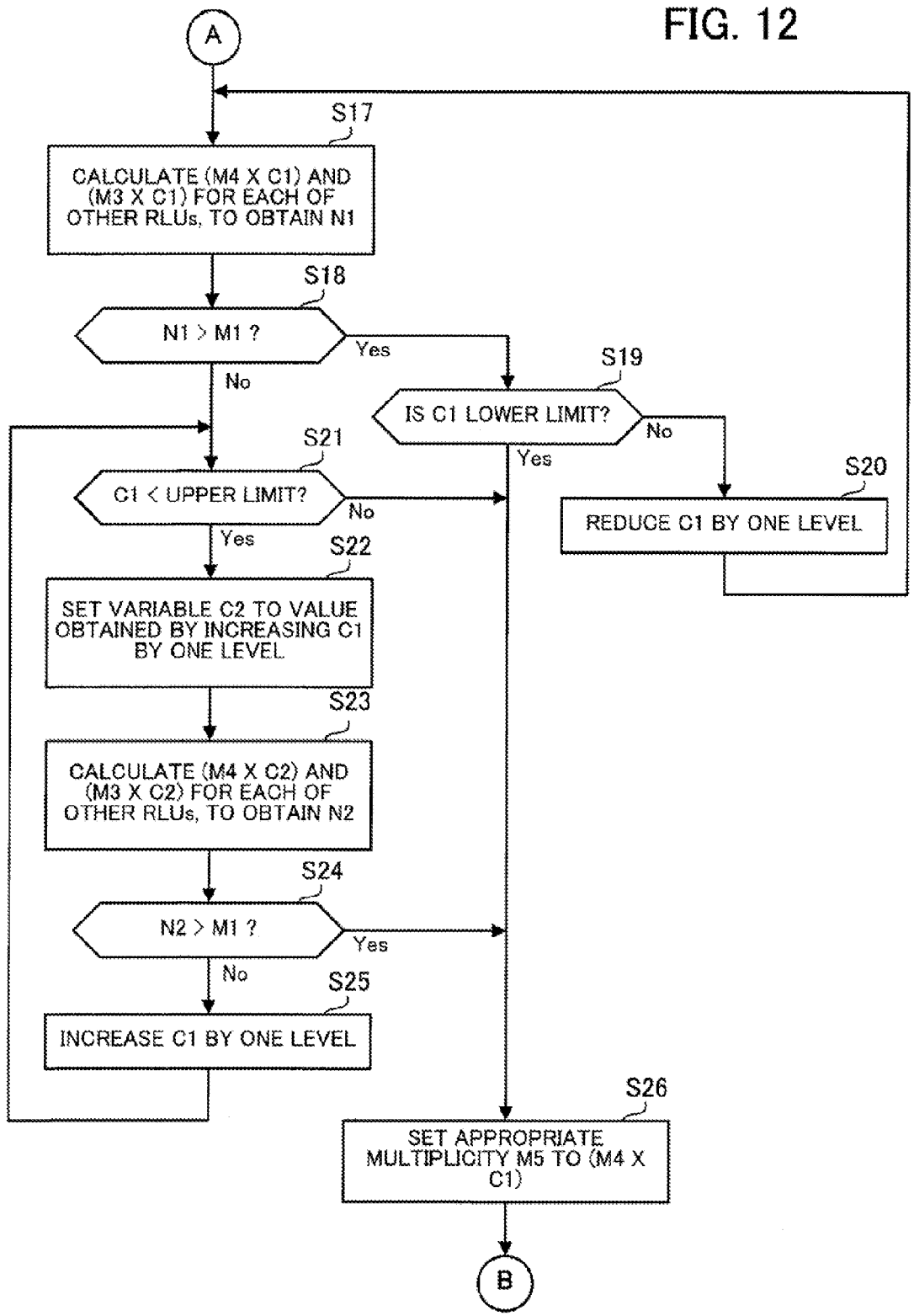
FIG. 12 is a second flowchart illustrating the example of procedures performed by the recovery control unit at the time of requesting execution of partial processes.
Figure 13:
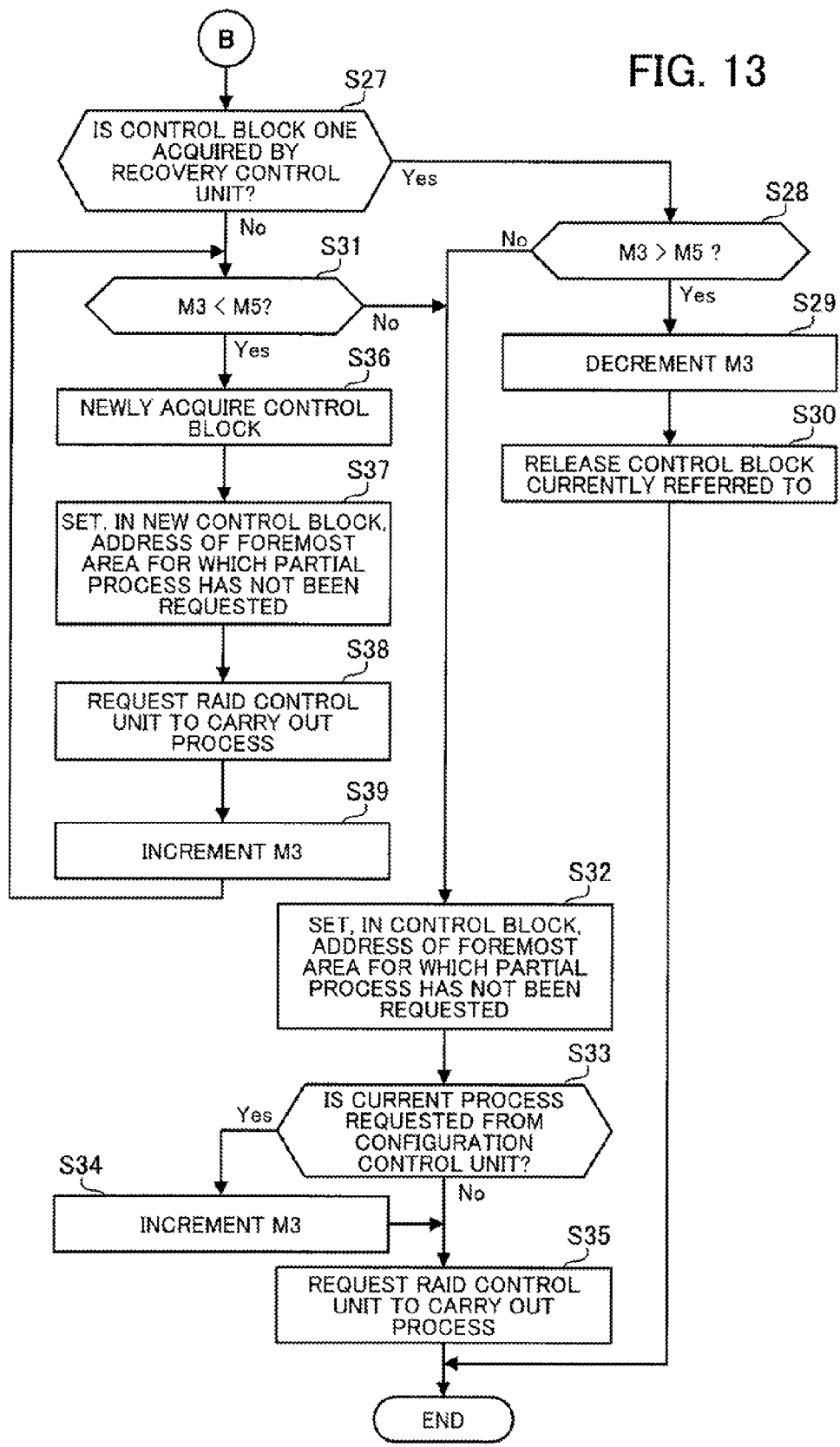
FIG. 13 is a third flowchart illustrating the example of procedures performed by the recovery control unit at the time of requesting execution of partial processes.

Next, the above-described adjustment process is described using flowcharts. FIGS. 11 to 13 are flowcharts illustrating an example of procedures performed by a recovery control unit at the time of requesting carrying out of partial processes. At the time of receiving a control block notice from the configuration control unit 224 and being requested to execute a rebuild associated process, or at the time of receiving a control block notice from the RAID control unit 221 and receiving a response notifying of completion of a partial process, the process illustrated in FIGS. 11 to 13 is carried out with reference to the control block notified of. Note however that detailed processing in the latter case (that is, in the case of receiving a response from the RAID control unit 221) is described with reference to FIG. 14 later.

[Step S11] The recovery control unit 223 inquires of the host I/O monitoring unit 225 about whether a host I/O process is in progress for an RLU set in the control block notified of. In the case where no host I/O process for the RLU is in progress, the recovery control unit 223 advances the process to Step S12. On the other hand, if a host I/O process for the RLU is in progress, the recovery control unit 223 advances the process to Step S14.

[Step S12] The recovery control unit 223 inquiries of the buffer monitoring unit 226 about the usage of the buffer area 231. Based on a response from the buffer monitoring unit 226, the recovery control unit 223 advances the process to Step S13 in the case where the usage of the buffer area 231 is less than or equal to a predetermined threshold. On the other hand, in the case where the usage of the buffer area 231 exceeds the predetermined threshold, the recovery control unit 223 advances the process to Step S14.

[Step S13] In the case where no host I/O process for the RLU is in progress (S11: Yes) and the usage of the buffer area 231 is less than or equal to the threshold (S12: Yes), the recovery control unit 223 sets a multiplicity set value M4 for the RLU to the single RLU multiplicity upper limit M2, which is preliminarily set. Note that the multiplicity set value M4 is an internal variable used in the process of FIGS. 11 to 13, and is stored in, for example, the RAM 212.

[Step S14] In the case where a host I/O process for the RLU is in progress (S11: No), or in the case where the usage of the buffer area 231 exceeds the threshold (S12: No), the recovery control unit 223 refers, in the RAID management table 241, to one of the records 241a corresponding to the RLU and reads rebuild priority set for the RLU. The recovery control unit 223 advances the process to Step S15 in the case where the rebuild priority is "high" (S14: Yes). On the other hand, if the rebuild priority is "low" (S14: No), the recovery control unit 223 advances the process to Step S16.

[Step S15] In the case where the rebuild priority for the RLU is "high" (S14: Yes), the recovery control unit 223 reads a RAID configuration (the RAID level and the number of disks used) for the RLU from the record 241a referred to in Step S14. The recovery control unit 223 reads, from the multiplicity setup table 242, a configuration-specific multiplicity upper limit corresponding to the RAID configuration. The recovery control unit 223 sets the multiplicity set value M4 to the configuration-specific multiplicity upper limit read from the multiplicity setup table 242.

[Step S16] In the case where the rebuild priority for the RLU is "low" (S14: No), the recovery control unit 223 sets the multiplicity set value M4 to "1", which is a multiplicity lower limit. Note that, in Step S16, a value obtained by subtracting a fixed value from the configuration-specific multiplicity upper limit acquired in Step S15 (note however that the lower limit is "1"), or an integer of a value obtained by reducing the configuration-specific multiplicity upper limit at a predetermined rate, for example, may be set as the multiplicity set value M4. In addition, the rebuild priority may be indicated using, for example, values representing three or more levels. In this case, the recovery control unit 223 may set a value corresponding to the rebuild priority as the multiplicity set value M4, instead of performing Steps S14 to S16. Note that the value corresponding to the rebuild priority does not exceed the configuration-specific multiplicity upper limit. For example, in the case where the rebuild priority is "high", the configuration-specific multiplicity upper limit may be set as the multiplicity set value M4. If the rebuild priority is "medium", an integer of a value of one-half of the configuration-specific multiplicity upper limit may be set as the multiplicity set value M4. If the rebuild priority is "low", "1" may be set as the multiplicity set value M4.

[Step S17] The recovery control unit 223 calculates (M4×C1) by multiplying the multiplicity set value M4 for the RLU by the multiplicity adjustment factor C1 currently set. In addition, the recovery control unit 223 reads, from the RAM 212, the current multiplicity M3 for one or more other RLUs, for which rebuild associated processes are being executed. The recovery control unit 223 calculates (M3×C1) for each of the other RLUs, and then calculates a total value N1 obtained by adding (M3×C1) for each of the other RLUs to (M4×C1) above. Note that, according to this embodiment, the current multiplicity M3 for each RLU is preliminarily set in the RAM 212. However, for example, a control block in which a rebuild associated process is set in the process name may be searched for with respect to each RLU, to thereby acquire the current multiplicity M3 for each RLU.

[Step S18] The recovery control unit 223 determines whether the calculated total value N1 is more than the gross multiplicity upper limit M1. In the case where N1 is more than M1 (S18: Yes), the recovery control unit 223 advances the process to Step S19. On the other hand, in the case where N1 is less than or equal to M1 (S18: No), the recovery control unit 223 advances the process to Step S21.

[Step S19] In the case where the total value N1 is more than the gross multiplicity upper limit M1 (S18: Yes), the recovery control unit 223 reduces the multiplicity adjustment factor C1, to thereby reduce the multiplicity for all the RLUs, for which rebuild associated processes are being executed. The recovery control unit 223 first determines whether the multiplicity adjustment factor C1 is a predetermined lower limit. Note that the lower limit of the multiplicity adjustment factor C1 is set to an arbitrary value more than 0 and less than 1. In the case where C1 is the lower limit (S19: Yes), the recovery control unit 223 advances the process to Step S26. On the other hand, if C1 is more than 1 (S19: No), the recovery control unit 223 advances the process to Step S20.

[Step S20] The recovery control unit 223 reduces the multiplicity adjustment factor C1 by one level. After this, the recovery control unit 223 returns the process back to Step S17, in which (M4×C1) and (M3×C1) for each of the other RLUs are calculated using the reduced C1, based on the result of which the total value N1 is calculated.

[Step S21] In the case where the total value N1 obtained in Step S17 is less than or equal to the gross multiplicity upper limit M1 (S18: No), the recovery control unit 223 increases the multiplicity adjustment factor C1, to thereby see whether the overall multiplicity may be set higher. The recovery control unit 223 first determines whether C1 currently set is less than the upper limit "1". In the case where C1 is less than the upper limit (S21: Yes), the recovery control unit 223 advances the process to Step S22. On the other hand, if C1 has reached the upper limit (S21: No), the recovery control unit 223 advances the process to Step S26.

[Step S22] The recovery control unit 223 obtains a value by increasing the multiplicity adjustment factor C1 currently set by one level, and sets a variable C2 to the obtained value. Note that the variable C2 is an internal variable used in the process of FIGS. 11 to 13, and is stored in, for example, the RAM 212.

[Step S23] The recovery control unit 223 performs a similar calculation to that in Step S17 using the variable C2 in place of the multiplicity adjustment factor C1, and calculates a total value N2 obtained by adding (M4×C2) to (M3×C2) for each of the other RLUs.

[Step S24] The recover control unit 223 determines whether the calculated total value N2 is more than the gross multiplicity upper limit M1. In the case where N2 is more than M1 (S24: Yes), the recovery control unit 223 advances the process to Step S26. On the other hand, if N2 is less than or equal to M1 (S24: No), the recovery control unit 223 advances the process to Step S25.

[Step S25] In the case where the total value N2 is less than or equal to the gross multiplicity upper limit M1, it is allowed to set the multiplicity adjustment factor C1 to the same value as the variable C2 set in Step S22. Accordingly, the recovery control unit 223 increases C1 by one level, to thereby match C1 to the variable C2. After this, the recovery control unit 223 returns the process back to Step S21 and determines whether the increased C1 has reached the upper limit.

[Step S26] It is determined that (M4×C1) is appropriate multiplicity to be set for the RLU.

For example, in the case where the total value N1 is more than the gross multiplicity upper limit M1 (S18: Yes), the multiplicity adjustment factor C1 is progressively reduced (S20) until N1 becomes less than or equal to M1. Then, when N1 becomes less than or equal to M1 (S18: No), C1 becomes less than the upper limit "1" (S21: Yes) and N2 based on C2, which is greater than C1 by one level, exceeds M1 (S24: Yes). Therefore, it is understood that the current C1 is appropriate. In addition, in the case where the total value N1 is less than or equal to the gross multiplicity upper limit M1 (S18: No), C1 is progressively increased (S25) until C1 reaches the upper limit "1" (S21: No), or N2 based on C2, which is greater than C1 by one level, exceeds M1 (S24: Yes). With this, C1 is set to an appropriate value. In the above-described manner, once the multiplicity to be set for the RLU is determined, the recovery control unit 223 sets (M4×C1) as appropriate multiplicity M5 for the RLU. Note that the appropriate multiplicity M5 is an internal variable used in the process of FIGS. 11 to 13, and is stored in, for example, the RAM 212. From the next step, Step S27, onward, the recovery control unit 223 executes an operation for matching actual multiplicity for the RLU to the appropriate multiplicity M5.

[Step S27] The recovery control unit 223 determines whether the control block currently referred to is a control block acquired by the recovery control unit 223 itself. Note that the recovery control unit 223 may implement the determining process of Step S27 by, for example, storing the ID of a control block in the RAM 212 when receiving a notice of the control block from the configuration control unit 224. In the case where the control block currently referred to is acquired by the recovery control unit 223 itself (S27: Yes; in the case where the control block currently referred to is, for example, one of the control blocks BL2 to BL4 of FIG. 6), the recovery control unit 223 advances the process to Step S28. On the other hand, if the control block currently referred to is notified of by the configuration control unit 224 (S27: No; in the case where the control block currently referred to is, for example, the control block BL1 of FIG. 6), the recovery control unit 223 advances the process to Step S31.

[Step S28] The recovery control unit 223 determines whether the current multiplicity M3 for the RLU is more than the appropriate multiplicity M5. In the case where M3 is more than M5 (S28: Yes), the recovery control unit 223 advances the process to Step S29. On the other hand, if M3 is less than or equal to M5 (S28: No), the recovery control unit 223 advances the process to Step S32.

[Step S29] In the case where the current multiplicity M3 for the RLU is more than the appropriate multiplicity M5 (S28: Yes), the recovery control unit 223 reduces the actual multiplicity for the RLU. Therefore, the recovery control unit 223 first decrements the current multiplicity M3 for the RLU by "1".

[Step S30] The recovery control unit 223 releases the control block currently referred to and ends an operation corresponding to the control block.

[Step S31] The recovery control unit 223 determines whether the current multiplicity M3 for the RLU is less than the appropriate multiplicity M5. In the case where M3 is less than M5 (S31: Yes), the recovery control unit 223 advances the process to Step S36. On the other hand, if the M3 is more than or equal to M5 (S31: No), the recovery control unit 223 advances the process to Step S32.

[Step S32] In the case where the current multiplicity M3 for the RLU is less than or equal to the appropriate multiplicity M5 in Step S28 (S28: No), or in the case where the current multiplicity M3 for the RLU is more than or equal to the appropriate multiplicity M5 in Step S31 (S31: No), it is determined that the actual multiplicity for the RLU has been adjusted appropriately. In this case, the recovery control unit 223 determines an address indicating, within an area targeted for the rebuild associated process (hereinafter, the "rebuild associated process target area") for the RLU, the foremost area for which a partial process has not been requested to the RAID control unit 221. The recovery control unit 223 overwrites the address set in the control block currently referred to with the determined address as the next processing target. Specifically, the recovery control unit 223 searches for a control block in which the RLU is set, and extracts, from a range of the address set in a found control block, an address indicating the last area (the opposite end from the foremost area) of the rebuild associated process target area. Then, the recovery control unit 223 overwrites the address of the control block currently referred to with an address indicating an area following the area indicated by the extracted address.

[Step S33] The recovery control unit 223 determines whether the current operation based on the control block currently referred to is an operation in response to a request from the configuration control unit 224. In the case where the current operation is an operation in response to a request from the configuration control unit 224 (S33: Yes), the recovery control unit 223 advances the process to Step S34. On the other hand, if the current operation is an operation corresponding to a response from the RAID control unit 221 (S33: No), the recovery control unit 223 advances the process to Step S35.

[Step S34] In the case where the current operation is a process in response to a request from the configuration control unit 224 (S33: Yes), a partial process based on the control block currently referred to, which partial process is to be requested to the RAID control unit 221, is not reflected in the current multiplicity M3. Therefore, the recovery control unit 223 increments the current multiplicity M3 for the RLU by "1". The operation of the recovery control unit 223 at the timing T18 of FIG. 6 is an example of processing performed in the order of Steps S33 (Yes) and S34. On the other hand, the operations of the recovery control unit 223 at the timing T17 and T23 of FIG. 6 are examples of the case in which "No" in Step S33 is obtained.

[Step S35] The recovery control unit 223 notifies the RAID control unit 221 of the ID of the control block currently referred to, whose address is updated in Step S32, and requests the RAID control unit 221 to carry out a partial process based on the control block. With this, the process corresponding to the control block having been referred to is finished.

[Step S36] In the case where the current multiplicity M3 for the RLU is less than the appropriate multiplicity M5 in Step S31 (S31: Yes), the multiplicity for the RLU may be set higher. In this case, the recovery control unit 223 newly acquires a control block. At that time, the same information set in the control block currently referred to, regarding the RLU number, process name, read source disk number, and write destination disk number, is set in the acquired control block.

[Step S37] According to a similar procedure to that of Step S32, the recovery control unit 223 determines an address indicating, within the rebuild associated process target area for the RLU, the foremost area for which a partial process has not been requested to the RAID control unit 221. The recovery control unit 223 overwrites the address of the newly acquired control block with the determined address as the next processing target.

[Step S38] The recovery control unit 223 notifies the RAID control unit 221 of the ID of the newly acquired control block, and requests the RAID control unit 221 to carry out a partial process based on the control block.

[Step S39] The recovery control unit 223 increments the current multiplicity M3 for the RLU by "1". After this, the recovery control unit 223 returns to the process of Step S31. Note that the operation of Step S39 may be carried out at an arbitrary timing during the time after the execution of Step S31 up to the start of the execution of Step S31 next time after the operation of Step S38 is carried out.

In the case where the operations of Steps S27 (Yes), S28 (Yes), S29 and S30 are sequentially carried out according to the process illustrated in FIG. 13, the multiplicity for the RLU is reduced and accordingly the speed of the rebuild associated process for the RLU is reduced. On the other hand, in the case where the operations of Steps S27 (No) and S31 (Yes) are performed, the subsequent operations of Steps S36 to S39 are carried out. With this, the multiplicity for the RLU increases and, accordingly, the speed of the rebuild associated process for the RLU increases.

Note that according to the process example of FIG. 13, only if the control block currently referred to is a control block notified of by the configuration control unit 224, a new control block is acquired to thereby increase the multiplicity. However, for example, also in the case where the control block currently referred to is a control block acquired by the recovery control unit 223 itself, a new control block may be acquired to thereby increase the multiplicity.

Figure 14:
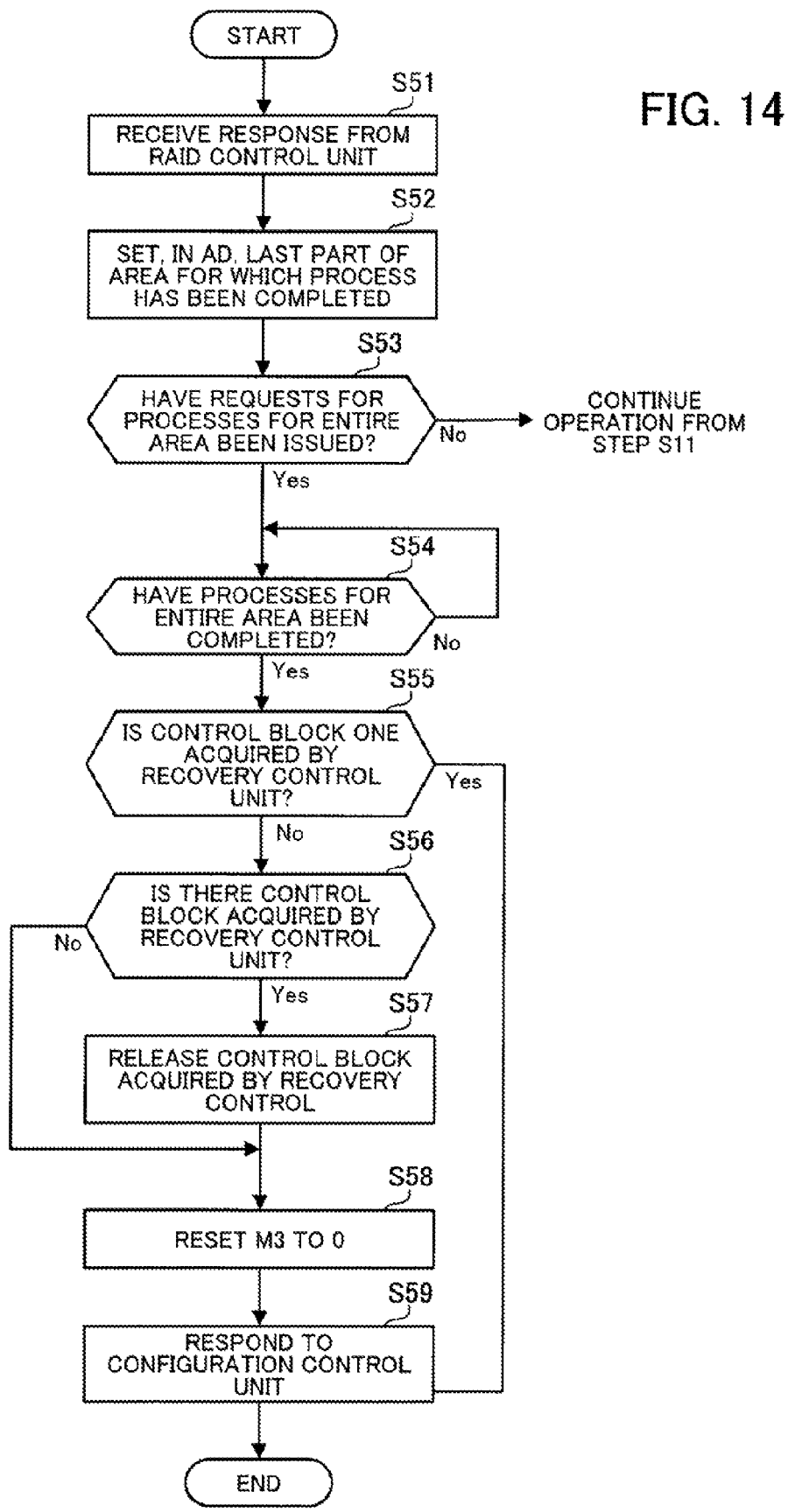
FIG. 14 is a flowchart illustrating an example of procedures performed by the recovery control unit at the time of receiving a response from a RAID control unit.

Next, FIG. 14 is a flowchart illustrating an example of procedures performed by the recovery control unit at the time of receiving a response from the RAID control unit.

[Step S51] The recovery control unit 223 receives a response to a request for a rebuild associated process from the RAID control unit 221. At that point, the recovery control unit 223 receives a notice of the ID of a control block corresponding to a partial process whose execution has been completed. Subsequently, the recovery control unit 223 performs processing with reference to the control block corresponding to the ID notified of by the RAID control unit 221.

[Step S52] As for the RLU set in the control block notified of by the RAID control unit 221, the recovery control unit 223 sets, in the completion address AD of the RAM 212, an address indicating the last part of the area for which execution of a partial process has been completed. Specifically, the recovery control unit 223 searches for a control block in which the RLU is set, and extracts, from the address item set in a found control block, an address indicating the foremost area of the rebuild associated process target area. The recovery control unit 223 records, in the RAM 212 as the completion address AD for the RLU, the address of an area shifted one block toward the foremost area from the area indicated by the extracted address.

[Step S53] The recovery control unit 223 determines whether requests for partial processes with respect to the entire rebuild associated process target area for the RLU have been issued to the RAID control unit 221. Specifically, the recovery control unit 223 searches for a control block in which the RLU is set, and extracts, from the address item set in a found control block, an address indicating the last area (the opposite end from the foremost area) of the rebuild associated process target area. Then, in the case where the area indicated by the extracted address is the last area of the rebuild associated process target area, the recovery control unit 223 determines that requests for partial processes for the entire target area have already been issued. In the case where requests for partial processes for the entire target area have already been issued (S53: Yes), the recovery control unit 223 advances the process to Step S54. On the other hand, if there is an area for which a request for a partial process has yet to be issued (S53: No), the recovery control unit 223 executes the process illustrated in FIGS. 11 to 13, taking S11 of FIG. 11 for the starting point. That is, the recovery control unit 223 determines whether the multiplicity for the RLU is appropriate and then adjusts the multiplicity each time of receiving a response from the RAID control unit 221 until requests for partial processes for the entire rebuild associated process target area have been issued.

[Step S54] In the case where requests for partial processes for the entire rebuild associated process target area have already been issued (S53: Yes), the recovery control unit 223 determines whether the partial processes for the entire rebuild associated process target area have been completed. If the completion address AD for the RLU set in the RAM 212 indicates the last part of the rebuild associated process target area, the recovery control unit 223 determines that the partial processes for the entire area have been completed (S54: Yes) and then advances the process to Step S55. On the other hand, in the case where the partial processes for the entire rebuild associated process target area have yet to be completed (S54: No), the recovery control unit 223 waits until the completion of the partial processes for the entire area. In this case, when receiving, from the RAID control unit 221, a completion notice of a partial process based on a different control block for the same RLU and carrying out the process of FIG. 14 with reference to the different control block, the recovery control unit 223 updates the completion address AD by the operation of Step S52. When the completion address AD indicates the last part of the rebuild associated process target area by the process with reference to a different control block in Step S54, the recovery control unit 223 advances the process to Step S55.

[Step S55] The recovery control unit 223 determines whether the control block currently referred to is a control block acquired by the recovery control unit 223 itself. In the case where the control block currently referred to is a control block acquired by the recovery control unit 223 itself (S55: Yes; in the case where the control block currently referred to is, for example, one of the control blocks BL2 to BL4 of FIG. 6), the recovery control unit 223 ends the process based on the control block currently referred to. In this case, the control block referred to is released by an operation of Step S57 described below, which is performed by referring to a control block notified of by the configuration control unit 224. On the other hand, in the case where the control block currently referred to is a control block notified of by the configuration control unit 224 (S55: No; in the case where the control block currently referred to is, for example, the control block BL1 of FIG. 6), the recovery control unit 223 advances the process to Step S56. In this case, with reference to the control block notified of by the configuration control unit 224, the recovery control unit 223 performs operations of Step S56 onward, in which procedures for completing the rebuild associated process for the RLU are carried out and the recovery control unit 223 notifies the configuration control unit 224 of the process completion.

[Step S56] The recovery control unit 223 determines whether there is a control block acquired by the recovery control unit 223 itself, in which control block the same RLU number and process name are set as those set in the control block currently referred to. In the case where the current multiplicity M3 for the RLU is 2 or more, there is one or more control blocks for the RLU acquired by the recovery control unit 223 itself besides the control block notified of by the configuration control unit 224. In the case where there is one or more control blocks acquired by the recovery control unit 223 itself (S56: Yes), the recovery control unit 223 advances the process to Step S57. On the other hand, there is no control block acquired by the recovery control unit 223 itself (S56: No), the recovery control unit 223 advances the process to Step S58.

[Step S57] The recovery control unit 223 releases the one or more control blocks determined in Step S56 (that is, the one or more control blocks acquired by the recovery control unit 223 itself). With this, there is no control block in which the same RLU number and process name are set, except for the control block currently referred to.

[Step S58] The recovery control unit 223 resets the current multiplicity M3 for the RLU to "0".

[Step S59] The recovery control unit 223 deletes the read source disk number and write destination disk number from the control block referred to. The recovery control unit 223 notifies the configuration control unit 224 of the ID of the control block from which those disk numbers have been deleted, and responds to the configuration control unit 224 with a notice of execution completion of the rebuild associated process indicated by the process name set in the control block.

On receiving the response, the configuration control unit 224 releases a control block corresponding to the ID notified of by the recovery control unit 223, and completes the rebuild associated process that the configuration control unit 224 requested to the recovery control unit 223.

According to the second embodiment described above, the multiplicity of partial processes in a rebuild associated process is optimized for each RLU according to the usage of the buffer area 231, the presence or absence of a host I/O process for each RLU in progress, and the rebuild priority for each RLU. This allows the rebuild associated process to speed up while reducing the influence on the performance of the host I/O process as much as possible.

According to one aspect, the speed of the rebuild process is increased.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage system comprising:
a plurality of storage apparatuses including a first and a second storage apparatus; and
a storage control apparatus including one or more processors configured to perform a procedure including:
receiving a control block requesting a rebuild process that reconstructs, in the second storage apparatus, data originally recorded in the first storage apparatus based on data stored in other storage apparatuses that have been assigned, together with the first storage apparatus, to a logical storage area,
splitting a data read range specified in the control block into a plurality of split data read ranges, as well as a data write range specified in the control block into a plurality of split data write ranges, and
executing the rebuild process by running a plurality of partial processes in parallel with each other, each partial process being a combination of a data read process to read out data from one of the split data read ranges in the other storage apparatuses assigned to the logical storage area and a data write process to generate write data from the data read out of the one of the split data read ranges and write the generated write data into one of the split data write ranges in the second storage apparatus.

2. The storage system according to claim 1, wherein:
the logical storage area is provided in plurality,
each of the logical storage areas is made up of storage areas of a different combination of storage apparatuses and configured such that data is redundantly stored in the different combination of storage apparatuses, and
one or more partial processes are executed for each of the logical storage areas.

3. The storage system according to claim 2, wherein the procedure further includes:
   executing, in parallel with the rebuild process, a host access process of accessing at least one of the logical storage areas in response to a request from a host apparatus,
   setting a multiplicity of partial processes for each of the logical storage areas, the multiplicity being a number of partial processes allowed to be executed in parallel for one logical storage area, and
   reducing the multiplicity of partial processes for a logical storage area, when both the host access process and the rebuild process are being executed for the logical storage area.

4. The storage system according to claim 3, wherein the procedure further includes:
   storing, in a memory of the storage control apparatus, a multiplicity values corresponding to different configurations used for data redundancy in the logical storage areas, the multiplicity values having been determined such that the different configurations for data redundancy influence on the execution of the host process in substantially equal degrees, and
   setting the multiplicity of partial processes for a logical storage by assigning one of the multiplicity values that corresponds to the configuration used in the logical storage area, when both the host access process and the rebuild process are being executed for the logical storage area.

5. The storage system according to claim 4, wherein the procedure further includes:
   setting the multiplicity of partial processes for each logical storage area with no host access being executed, by assigning a common multiplicity value predetermined for use with the logical storage areas having different configurations for data redundancy.

6. The storage system according to claim 3, wherein the reducing the multiplicity of partial processes gives a greater reduction in the multiplicity as priority set for the logical storage area is lower.

7. The storage system according to claim 2, wherein the procedure further includes:
   setting multiplicity of partial processes for each of the logical storage areas, the multiplicity being a number of partial processes allowed to be executed in parallel for one logical storage area, and
   reducing, when buffer usage in the storage control apparatus exceeds a predetermined threshold, the multiplicity of the partial processes for the logical storage areas.

8. The storage system according to claim 7, wherein the procedure further includes:
   determining whether the buffer usage exceeds the threshold, each time the execution of one of the partial processes for a logical storage area is completed, and
   reducing, upon determination that the buffer usage exceeds the threshold, the multiplicity of partial processes for the logical storage area corresponding to the completed partial process.

9. The storage system according to claim 8, wherein the procedure further includes:
   executing a host access process of accessing at least one of the logical storage areas in response to a request from a host apparatus,
   storing, in a memory of the storage control apparatus, multiplicity values corresponding to different configurations used for data redundancy in the logical storage areas, the multiplicity values having been determined such that the different configurations for data redundancy influence on the execution of the host process in substantially equal degrees, and
   setting, upon determination that the buffer usage exceeds the threshold at the time when the execution of the partial process is completed, the multiplicity of partial processes for the logical storage area corresponding to the completed partial process, by assigning one of the multiplicity values that corresponds to the configuration used for data redundancy in the logical storage area.

10. The storage system according to claim 8, wherein the procedure further includes:
    setting, upon determination that the buffer usage exceeds the threshold at the time when the execution of the partial process is completed, the multiplicity of partial processes for the logical storage area corresponding to the completed partial process by assigning a common multiplicity value predetermined for use with the logical storage areas having different configurations for data redundancy.

11. The storage system according to claim 8, wherein the reducing the multiplicity of partial processes gives a greater reduction in the multiplicity as priority set for the logical storage area is lower.

12. The storage system according to claim 2, wherein the procedure further includes:
    executing a host access process of accessing at least one of the logical storage areas in response to a request from a host apparatus is executed in parallel with the rebuild process, and
    adjusting, each time the execution of one of the partial processes is completed, the multiplicity of partial processes for the logical storage area corresponding to the completed partial process, according to whether the host access process is being executed for the logical storage area or whether buffer usage in the storage control apparatus exceeds a predetermined threshold, and changing the multiplicity of partial processes for each of the logical storage areas at a constant rate so that a total number of partial processes being executed comes closer to but does not exceed a predetermined upper limit.

13. The storage system according to claim 1, wherein the procedure further includes:
    starting, each time one of the two or more partial processes being executed is completed, new partial processes for a next unprocessed split data read range and a next unprocessed data write range, until the rebuild process for the logical storage area is completed.

14. The storage system according to claim 1, wherein the procedure further includes:
    executing a copy back process or a redundant copy process as a plurality of partial processes, the copy back process being a process of writing the reconstructed data from the second storage apparatus to a third storage apparatus installed in place of the first storage apparatus, the redundant copy process being a process of executing the rebuild process without separating off the first storage apparatus from the logical storage area, and
    executing two or more of the partial processes included in the redundant copy process or the copy back process, in parallel with each other.

15. A storage control apparatus for controlling access to a plurality of storage apparatuses including first and second storage apparatuses, the storage control apparatus comprising:
    one or more processors configured to perform a procedure including:

receiving a control block requesting a rebuild process that reconstructs, in the second storage apparatus, data originally recorded in the first storage apparatus based on data stored in other storage apparatuses that have been assigned, together with the first storage apparatus, to a logical storage area, splitting a data read range specified in the control block into a plurality of split data read ranges, as well as a data write range specified in the control block into a plurality of split data write ranges, and executing the rebuild process by running a plurality of partial processes in parallel with each other, each partial process being a combination of a data read process to read out data from one of the split data read ranges in the other storage apparatuses assigned to the logical storage area and a data write process to generate write data from the data read out of the one of the split data read ranges and write the generated write data into one of the split data write ranges in the second storage apparatus.

16. A storage control method of a storage control apparatus for controlling access to a plurality of storage apparatuses including first and second storage apparatuses, the storage control method comprising:

receiving, by a processor, a control block requesting a rebuild process that reconstructs, in the second storage apparatus, data originally recorded in the first storage apparatus based on data stored in other storage apparatuses that have been assigned, together with the first storage apparatus, to a logical storage area;

splitting, by the processor, a data read range specified in the control block into a plurality of split data read ranges, as well as a data write range specified in the control block into a plurality of split data write ranges; and executing, by the processor, the rebuild process by running a plurality of partial processes in parallel with each other, each partial process being a combination of a data read process to read out data from one of the split data read ranges in the other storage apparatuses assigned to the logical storage area and a data write process to generate write data from the data read out of the one of the split data read ranges and write the generated write data into one of the split data write ranges in the second storage apparatus.

17. The storage control method according to claim 16, wherein:

the logical storage area is provided in plurality, each of the logical storage areas is made up of storage areas of a different combination of storage apparatuses and configured such that data is redundantly stored in the different combination of storage apparatuses, and one or more partial processes are executed for each of the logical storage areas.

18. The storage control method according to claim 17, further comprising:

executing, in parallel with the rebuild process, a host access process of accessing at least one of the logical storage areas in response to a request from a host apparatus, setting multiplicity of partial processes for each of the logical storage areas, the multiplicity being a number of partial processes allowed to be executed in parallel for one logical storage area, and reducing the multiplicity of partial processes for a logical storage area, when both the host access process and the rebuild process are being executed for the logical storage area.

19. The storage control method according to claim 18, further comprising:

storing, in a memory, a multiplicity values corresponding to different configurations used for data redundancy in the logical storage areas, the multiplicity values having been determined such that the different configurations for data redundancy influence on the execution of the host process in substantially equal degrees, and setting the multiplicity of partial processes for a logical storage by assigning one of the multiplicity values that corresponds to the configuration used in the logical storage area, when both the host access process and the rebuild process are being executed for the logical storage area.

20. The storage control method according to claim 18, wherein the reducing the multiplicity of partial processes gives a greater reduction in the multiplicity as priority set for the logical storage area is lower.

* * * * *